United States Patent
Arulf et al.

(10) Patent No.: US 10,518,912 B2
(45) Date of Patent: Dec. 31, 2019

(54) PAYLOAD JOINT

(71) Applicant: RUAG SPACE AB, Göteborg (SE)

(72) Inventors: Örjan Arulf, Linköping (SE); Magnus Thenander, Linköping (SE)

(73) Assignee: RUAG SPACE AB, Göteborg (SE)

( * ) Notice: Subject to any disclaimer, the term of this patent is extended or adjusted under 35 U.S.C. 154(b) by 0 days.

(21) Appl. No.: 16/226,060

(22) Filed: Dec. 19, 2018

(65) Prior Publication Data

US 2019/0225353 A1 Jul. 25, 2019

Related U.S. Application Data

(63) Continuation of application No. PCT/SE2018/050058, filed on Jan. 25, 2018.

(51) Int. Cl.
*B64G 1/64* (2006.01)
*B64G 1/00* (2006.01)

(52) U.S. Cl.
CPC ............ *B64G 1/641* (2013.01); *B64G 1/002* (2013.01); *B64G 1/645* (2013.01); *B64G 2001/643* (2013.01)

(58) Field of Classification Search
CPC .......... B64G 1/64; B64G 1/641; B64G 1/002; B64G 1/645
See application file for complete search history.

(56) References Cited

U.S. PATENT DOCUMENTS

| | | | |
|---|---|---|---|
| 5,411,226 A | 5/1995 | Jones et al. | |
| 5,613,653 A | 3/1997 | Bombled et al. | |
| 5,884,866 A * | 3/1999 | Steinmeyer | B64G 1/002 244/137.1 |
| 6,296,206 B1 * | 10/2001 | Chamness | B64G 1/00 244/173.3 |
| 2002/0179776 A1 * | 12/2002 | Mueller | B64G 1/007 244/158.5 |
| 2007/0063107 A1 | 3/2007 | Mueller et al. | |
| 2012/0112010 A1 * | 5/2012 | Young | B64G 1/641 244/173.1 |

(Continued)

FOREIGN PATENT DOCUMENTS

| | | |
|---|---|---|
| CN | 106043744 A | 10/2016 |
| FR | 923264 A | 7/1947 |

(Continued)

OTHER PUBLICATIONS

European Search Report (five pages) dated Jun. 4, 2019 from corresponding European Application No. EP18214069.9.

(Continued)

*Primary Examiner* — Justin M Benedik
(74) *Attorney, Agent, or Firm* — Brinks Gilson & Lione; John C. Freeman

(57) ABSTRACT

A payload joint (10) for detachably attaching to each other two adjacent construction elements (2) in a spacecraft and/or launch vehicle, the payload joint (10) comprises two opposing clamps (11a, 11b) and two opposing flanges of the construction elements collaborating with angled surfaces of the clamps (11a, 11b). The payload joint comprises a bolt that connects the clamps (11a, 11b) and drives them towards each other when tightening the payload joint (10). The payload joint (10) further comprises a bolt cutter (101) arranged for cutting the bolt upon activation.

16 Claims, 23 Drawing Sheets

(56) References Cited

U.S. PATENT DOCUMENTS

2014/0314476 A1* 10/2014 Tamiozzo ................ F16B 2/12
                                                      403/338
2015/0232205 A1   8/2015 Lively et al.
2016/0368625 A1* 12/2016 Field ...................... B64G 1/641

FOREIGN PATENT DOCUMENTS

| FR |       2584115 A1 | 1/1987 |
|----|------------------|--------|
| JP |    2000 153800 A | 6/2000 |
| WO |    WO 03/033349 A1 | 4/2003 |
| WO | WO 2013/080172 A1 | 6/2013 |

OTHER PUBLICATIONS

International Search Report and Written Opinion for PCT/SE2018/050058, completed May 5, 2018.

* cited by examiner

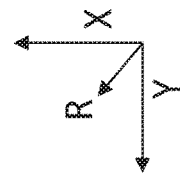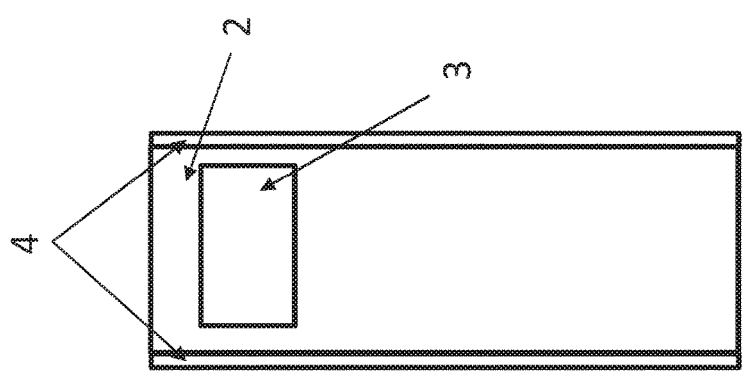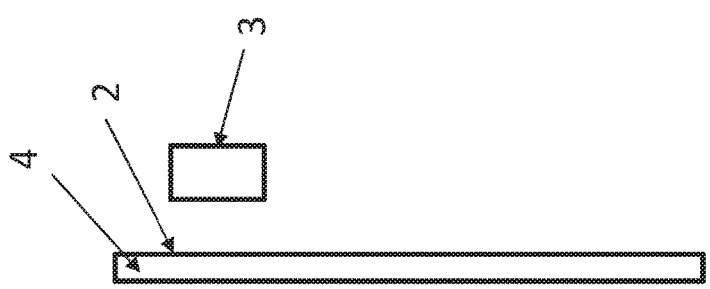
Fig. 4c
Fig. 4b
Fig. 4a

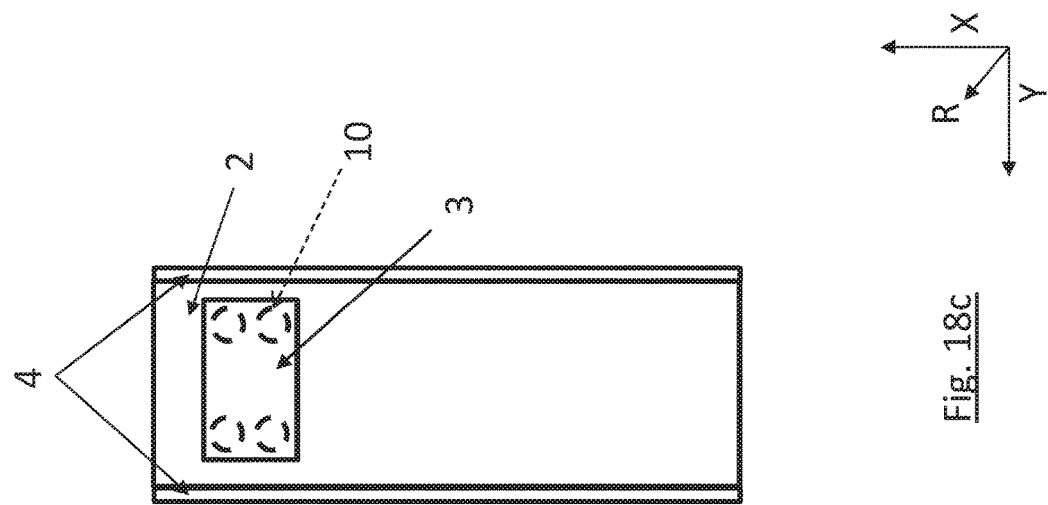
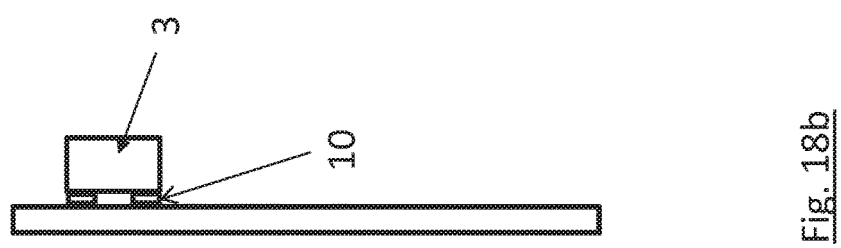
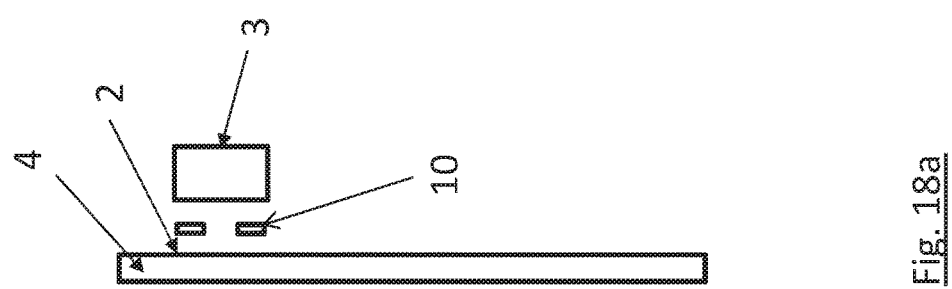

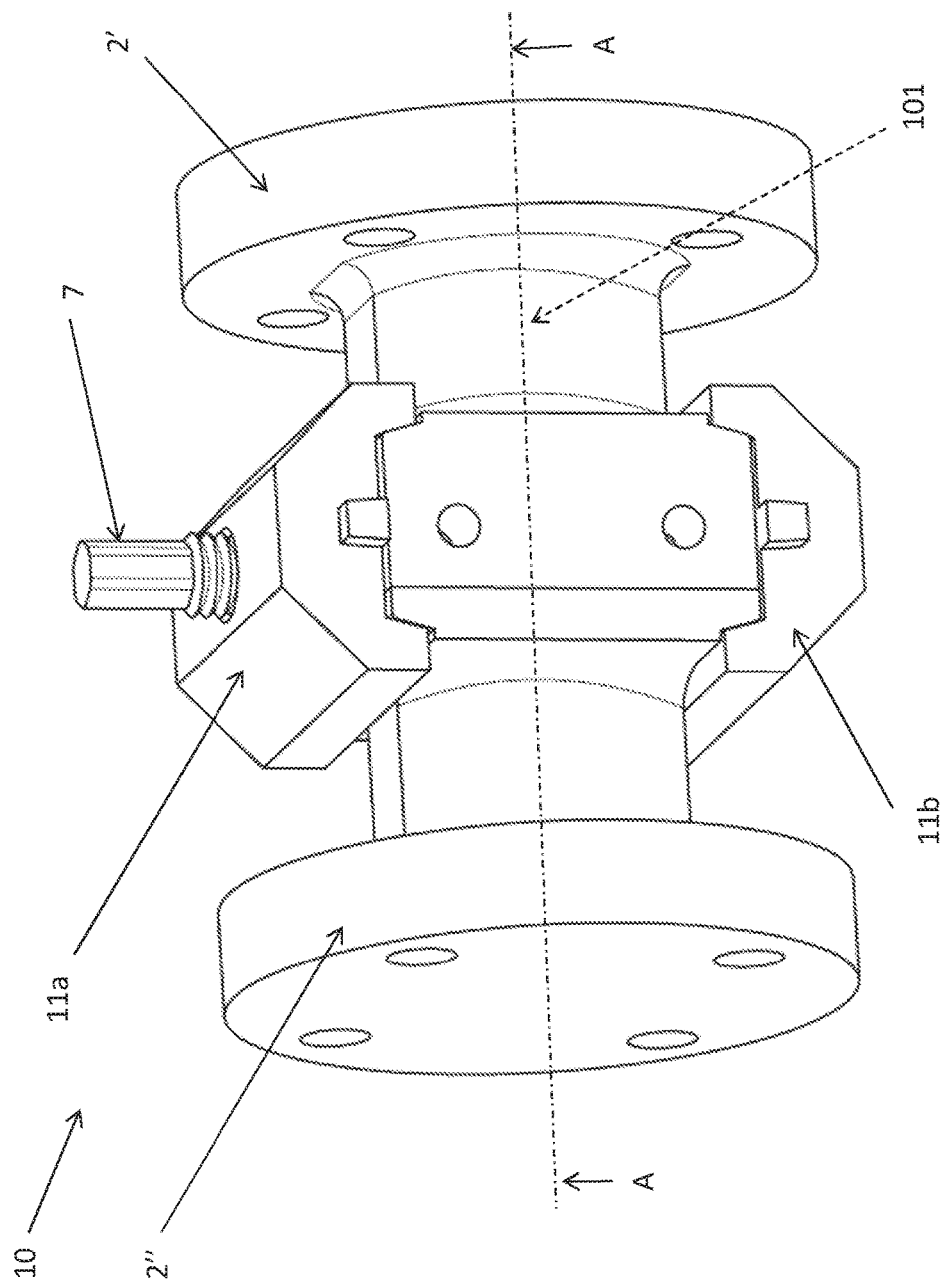

PAYLOAD JOINT

RELATED APPLICATIONS

This application is a continuation under 35 U.S.C. § 120 of International Application No. PCT/SE2018/050058, filed Jan. 25, 2018, which claims priority to International Application No. PCT/SE2017/050472, filed May 10, 2017, the contents of both of which is incorporated herein by reference in its entirety.

TECHNICAL FIELD

The present disclosure relates to a payload joint for detachably attaching to each other two adjacent construction elements in a spacecraft and/or a launch vehicle and further a dispenser comprising such a payload joint.

BACKGROUND

The preparation and integration of multiple payloads, for example satellites onto a dispenser or launch vehicle is traditionally an intricate and time consuming task. Typically the amount of time needed to integrate one satellite onto the launch vehicle is many hours. For a large dispenser intended for launch of constellation satellites the number of satellites in a launch can be up to and above 100. This amounts to approximately 10 weeks integration time doing it the classical way.

Hence, the attachment method of the payload as well as the payload release method are of significant importance. The release is known to be done by use of a separation device including a pyrotechnic device that is activated and that cuts the attachment when activated. Here, it is important that the forces used are balanced to secure a proper release, but the less force used the less risk of damage. Furthermore, a lesser but well directed force gives the opportunity to cut down on material in the parts close the attachment points.

There is thus a need for an improved payload joint.

SUMMARY

An object of the present disclosure is to provide an improved payload joint for detachably attaching to each other two adjacent construction elements for a spacecraft and/or a launch vehicle.

A payload is a spacecraft element attached to a launch vehicle. The payload can be a satellite, a satellite attached to a dispenser, a dispenser and/or a dispenser assembly with or without wiring. The dispenser can be made from one or several panels.

A launch vehicle transports a spacecraft, i.e., a payload, into position in space. The launch vehicle can be made from one or more parts, for example a launch vehicle adapter and/or a launch vehicle stage.

A payload joint is arranged to directly or indirectly detachably connect a payload to the launch vehicle and/or directly or indirectly detachably connect a first payload to a second payload, for example a satellite to a panel/dispenser or a first panel to a second panel.

The payload joint comprises:
a clamp comprising an inner clamp portion and an outer clamp portion facing the inner clamp portion, each clamp portion comprising a through opening,
wherein
the payload joint comprises
a bolt, configured to be arranged in the through openings, wherein
the inner clamp portion comprises a first and second inner clamp flange and an inner mid portion between the first and second inner flanges, wherein
the outer clamp portion comprises a first and second outer clamp flange and an outer mid portion between the first and second outer flanges,
wherein the joint comprises a first construction element end portion of a first construction element comprising a first end section and
a second construction element end portion of a second construction element comprising a second end section,
the first end section comprises a first outer construction element flange and a first inner construction element flange, wherein the second end section comprises a second outer construction element flange and a second inner construction element flange,
wherein the first end section comprises a first contact surface formed by a portion of an outer surface of the first outer construction element flange and by a portion of an outer surface of the first inner construction element flange, and wherein the second end section comprises a second contact surface formed by a portion of an outer surface of the second outer construction element flange and by a portion of an outer surface of the second inner construction element flange,
wherein the first and second contact surfaces are abutting each other in the payload joint forming a reference plane,
wherein a first inner clamp locking surface of the first inner clamp flange is arranged at a first angle to the reference plane,
wherein a first outer clamp locking surface of the first outer clamp flange is arranged at a second angle to the reference plane,
wherein a second inner clamp locking surface of the second inner clamp flange is arranged at a third angle to the reference plane,
wherein a second outer clamp locking surface of the second outer clamp flange is arranged at a fourth angle to the reference plane,
wherein a first inner construction element locking surface of the first inner construction element flange is arranged at a fifth angle to the reference plane,
wherein a first outer construction element locking surface of the first outer construction element flange is arranged at a sixth angle to the reference plane,
wherein a second inner construction element locking surface of the second inner construction element flange is arranged at a seventh angle to the reference plane,
wherein a second outer construction element locking surface of the second outer construction element flange is arranged at an eight angle to the reference plane, wherein the payload joint comprises a bolt cutter comprising a cutting device arranged at a cutting angle towards the bolt and a driving device arranged in connection to the cutting device and arranged to drive the cutting device towards the bolt with a shear force that breaks and separates the bolt into two or more pieces, wherein the cutting angle is defined with reference to a normal to a length extension of the bolt and being zero degrees or close to zero degrees.

One advantage is that the clamp arrangement allows for an easy attachment of the construction elements by the angled portions gears up the force from the bolt and tightens the payload joint when the bolt is screwed for attachment.

According to one example, the bolt comprises threads for screwing the bolt such that the clamps move towards each other, and consequently tightness the payload joint by forcing the flanges towards each other by the angled portions of the clamps and the flanges. According to one example, the bolt is attached to a nut outside the clamp arrangement. According to another example, one clamp comprises threads that engages the bolt threads. According to yet an example, both clamps comprise threads that engages two corresponding thread sets arranged in the bolt. According to one example, the threads in the bolt can be arranged by one thread set being oriented for clockwise rotation and the other for anti-clockwise rotation. According to one example, the threads in the bolt can be arranged by both thread sets being oriented for clockwise or anti-clockwise rotation, but with different angle of inclination on the thread. Hence, according to one example, the inner clamp portion and/or the outer clamp portion comprises a threaded through opening for allowing an at least partly threaded bolt to be threaded in the threaded opening.

According to one example, the bolt cutter is arranged to function in a pre-loaded mode and a release mode, wherein in the pre-loaded mode the cutting device is positioned adjacent to or at a distance to the bolt and the driving device is inactive, wherein in the release mode the driving device is active such that the driving device affects the cutting device into a motion towards the bolt with said shear force.

One advantage with the different modes is that it is possible to control the timing of the release and cutting of the payload joint. This timing is, for example, important when positioning multiple satellites in space that should be released.

The functioning of the driving device is known per se in prior art and can be any suitable device, for example one or more pyrotechnic devices that can be activated to secure a proper release of the payload.

Furthermore, the payload can be attached with more than one joint and the pre-loaded mode and release mode allows for a timing for releasing all payload joints according to a pre-designed release sequence.

According to one example, the bolt cutter comprises a driving device housing and a receiving housing, wherein the driving device is arranged in the driving device housing and wherein the receiving housing is arranged to receive the cutting device.

According to one example, the receiving housing comprises a cavity. One advantage with the cavity is that the cutting device can be forced through the bolt into the cavity and ensure that the bolt is cut. However, depending on the design of the cutting device, the cavity can be omitted. According to one example the cutting device has a cutting edge that allows for cutting the bolt without the cavity, but this example can also be combined with a cavity.

According to one example, the bolt cutter comprises two cutting devices positioned on either side of the bolt for cutting the bolt when the bolt cutter is activated. One cutting device is then positioned in one construction element and the other cutting device is positioned in the other construction element. This example can further be arranged with two driving devices, one driving device in either construction element. The corresponding driving device housings can then further double as receiving housings for the corresponding driving devices and can each be positioned in the respective construction elements.

Hence, as mentioned above the construction elements comprise the bolt cutter, wherein the first construction element comprises the driving device housing and wherein the second construction element could comprise the receiving housing in the form of the cavity or where the second construction element comprises a receiving portion arranged to receive the receiving housing cavity.

According to one example, the first construction element comprises the driving device housing and the receiving housing.

This has the advantage that one construction element comprises the entire bolt cutter which means that after separation of the payload joint, the bolt cutter accompanies the construction element with all its parts. Yet an advantage is that any debris after the separation will be collected by the driving device housing and the receiving housing. According to one example, the driving device housing and the receiving housing is arranged as one unit with a through opening for the bolt. This arrangement can be realized by that only the first construction element comprises the through opening for the bolt or that both the first and second construction elements comprise cavities in the flanges that together builds a through channel when the flanges are put together forming the payload joint. Hence, according to one example, the first end section and the second end section of the construction elements comprise cooperating channels forming a through opening for receiving the bolt of the payload joint.

According to one example when the first construction element comprises the driving device housing and the receiving housing, the cavity has a funnel shape. This has the advantage that the bolt and possible debris after cutting will be collected and stuck in the cavity. The bolt will typically be stuck in the more narrow part of the cavity after having cut the bolt and entered the cavity.

According to one example when the first construction element comprises the driving device housing and the receiving housing, the second construction element comprises a receiving portion for housing the receiving housing. This has the advantage that the bolt cutter can extend past the bolt for ensuring the separation as stated above.

It should be noted that the second construction element cavity can be the receiving housing should the driving housing be be separate from the receiving housing.

According to one example, the first inner clamp flange is arranged against the first inner construction element flange and the first angle is equal to or smaller or greater than the fifth angle, wherein the first outer clamp flange is arranged against the first outer construction element flange and the second angle is equal to or smaller or greater than the sixth angle,
wherein the second inner clamp flange is arranged against the second inner construction element flange and the third angle is equal to or smaller or greater than the seventh angle, wherein the second outer clamp flange is arranged against the second outer construction element flange and the fourth angle is equal to or smaller or greater than the eight angle.

According to one example, the construction elements are fastening means for securing the payload to the payload dispenser or to any other part of the spacecraft, as discussed above. Hence, the payload, e.g. a satellite, is mounted with one or several payload joints onto a panel attached to the launch vehicle, or directly onto the launch vehicle body.

According to one example, the construction elements are first and second panels being neighboring panels of the payload dispenser. This will be discussed further below.

The invention further relates to a dispenser comprising a panel comprising at least one payload mounted onto the panel with a payload joint according to any one of the examples discussed above.

According to one example, the dispenser comprises a plurality of panels, wherein at least one panel comprises at least one payload mounted onto the panel, wherein the panels are attachable to each other by means of at least one dispenser payload joint according to the above forming a self-supporting dispenser. This will be discussed further below.

According to one example, the payload is mounted onto the panel with a payload joint according to any one of the examples above.

According to one example, the payload dispenser comprises a payload in the form of a satellite.

A further object of the present disclosure is to provide an improved payload dispenser, an improved dispenser payload joint and an improved method for assembly of the dispenser. These objects are at least partly achieved by the features of the independent claims. The dependent claims contain further development of the payload dispenser and the dispenser payload joint.

The disclosed payload dispenser further eliminates the need for a plurality of support structures which in turn relocates and/or removes structural mass from e.g. interface structures on the dispenser. Yet further advantages are reduced number of parts and simplified tools required, which allows for shorter lead times and lower tooling costs.

The disclosure relates to a payload dispenser for a launch vehicle. The dispenser comprises a plurality of construction elements in the form of panels and at least one panel comprises at least one payload mounted onto the panel. The panels are attachable to each other forming a self-supporting dispenser. It should be noted that the assembled dispenser is a primary load bearing and self-supported structure. Here, primary load bearing refers to that the dispenser transfers the loads from the Launch Vehicle to the payload(s). The primary load carrying structure is designed as a facetted tube with detachable sides and the number of panels can be anything from three to more than ten.

According to one example, each panel comprises at least one payload. According to one example, at least one panel comprises a plurality of payloads.

Hence, the number of payloads per panel can vary between zero and a plurality. However, the dispenser always comprises at least one payload. The payload is advantageously positioned to balance the dispenser. Hence, the payload can be arranged symmetrically about the dispenser. For example, the dispenser comprises two opposing payloads positioned on opposing panels. Hence, one payload is positioned on one panel and the other is positioned on an opposing panel. The panels positioned between the payload mounted panels can then be free from payload. According to another example, all panels comprise at least one payload. If balance is part of the design parameter normal rules of symmetry apply for balancing the dispenser should the dispenser without the payload be balanced in itself. If the dispenser without the payload is not balanced, then the position of the payload can be used to create balance. Here, balance could refer to rotation and/or gravity symmetry about a fictive central longitudinal axis about which the dispenser is built.

The payload is advantageously mounted onto the panel before assembly of the dispenser. The payload is typically attached to an outside of the panel via payload mounting and separation means positioned in openings running from the outside and through the panel to a backsheet of the panel. The mounting and separation means are attached to the payload at one end and secured to the panel via securing means on the other end. One advantage with attaching the payload on the panels before assembly of the panels to each other is that the free panel grants easy access to the payload mounting and separation means compared to should the payload be attached to an already assembled dispenser structure. Furthermore, in prior art the payload is attached to a support structure that is attached to a dispenser body. With reference to that prior art, the panels gives the advantage that it grants access to the backside of the panels also when assembled into the dispenser without further tooling of a dispenser body. A further advantage is that the payload dispenser can be transported in sections, i.e. the panels, instead of in one very large and bulky entity. Hence, the panel is in itself self-supported such that it can be transported with the payload attached to it.

According to one example, the payload is a satellite. One or more panels may also comprise different or additional payloads such as cables, energy sources and communication devices.

The payload dispenser has an extension in a longitudinal direction and in a radial direction with reference to cylindrical coordinates. The reference system is chosen to simplify the description of the payload dispenser and should not be seen as limiting per se. The Longitudinal direction is typically the height direction and the radial direction is perpendicular to the longitudinal direction. With reference to the chosen reference system, the payload dispenser is delimited in the radial direction by the panels forming an envelope surface. Each panel comprises longitudinal attachment means in the longitudinal direction being attachable to neighboring panels. Hence, the panels are attachable to each other in an interface running in the longitudinal direction.

The attachment means are arranged to lock in position with relation to each other to allow for the self-supporting dispenser. The attachment means are arranged to be connected to each other during dispenser assembly and are arranged to fixate the panels in relation to each other. Here, lock in position and fixate refers to that the attachment means engage each other such that when the panels are positioned at a predetermined angle to each other, the panels cannot be hingeably rotated with relation to each other nor can they be moved in the longitudinal direction. Furthermore, today there exist a number of demands regarding the performance of the dispenser assembly, for example stiffness and the attachment means are arranged to meet such demands.

According to one example, the attachment means are arranged to allow for disassembly of parts of or the entire payload dispenser. This has the advantage that should a payload be faulty, the panel onto which the faulty payload is attached can be removed and exchanged to another panel instead of the more complicated task of removing and exchanging the payload itself as discussed above.

As mentioned before, the payload dispenser is delimited in the radial direction by the panels when assembled. Furthermore, the panels themselves can be described as being delimited in the longitudinal direction and a lateral direction being perpendicular to the longitudinal direction. When the dispenser is assembled by the panels the attachment means lie in the envelope surface.

According to one example, at least one or each panel has an unbroken extension in the longitudinal direction. Here, unbroken refers to that the panel is not assembled by parts in the longitudinal direction. However, the panel can be made from a single layer or a combination of layers in the thickness direction. Here, the thickness direction refers to the radial direction when the panels are assembled into the dispenser.

According to one example, at least one panel comprises panel portions attached to each other forming the panel.

According to one example, the panel portions are assembled in the longitudinal direction, i.e. the height direction. Here the at least one of the panel portions comprises laterally extending attachment means for assembly of the panel along the lateral direction being perpendicular to the height direction. The panel portions are also assembled in the longitudinal direction via the longitudinally extending attachment means forming the dispenser. Also here, the panel portions and thus the panels can be made from a single layer or a combination of layers in the thickness direction.

The panel portions are thus fixedly attached to each other via the longitudinal attachment means and via the lateral attachment means when applicable. The attachment means are arranged to lock in position with relation to each other to allow for the self-supporting dispenser according to what have been described above.

The disclosure also relates to a method for assembly of a payload dispenser according to any one of the preceding claims, wherein the method comprises the steps of
 a. mounting at least one payload onto one panel,
 b. attaching the panels to each other via longitudinally extending attachment means,
 c. locking the attachment means in position to hinder movement between the panels, and if applicable the panel portions, forming a self-supporting dispenser.

According to one example, the method comprises the step of mounting at least one payload onto each panel before assembly of the panels.

According to one example, the method comprises the step of attaching panel portions to each other via laterally extending attachment means.

As described above, the panels can be made from panel portions and the panel portions are connected to each other via laterally extending attachment means. The panels are attached to each other via the longitudinally extending attachment means. According to one example, the panel portions are attached to each other via the laterally extending attachment means before the panels are attached to each other via the longitudinally extending attachment means. According to another example, panel portions are attached to each other via longitudinally extending attachment means forming dispenser portions and the panel portions are then attached to each other via the laterally extending attachment means. In the latter example the dispenser can thus be built in sections, i.e. the dispenser portions, where the dispenser portions are positioned on top of each other in the height direction, i.e. the longitudinal direction.

Above have been described attachment means suitable for detachably attaching, i.e. connecting, panels in the longitudinal direction X and/or lateral direction Y. According to the specification, the attachment means comprises at least one dispenser payload joint in the longitudinal direction X or lateral direction Y.

According to one example, the longitudinal and/or lateral attachment means comprises one dispenser payload joint arranged along essentially the entire longitudinal and/or lateral edge extension of respective panel. According to another example, the longitudinal and/or lateral attachment means comprises at least one, but preferably at least two, dispenser payload joints arranged at the longitudinal and/or lateral edge extensions of respective panel. The dispenser payload joints are defined as arrangements capable of connecting, or locking together two neighboring panel portions in a detachable manner.

The number of panels in the payload dispenser can be chosen dependent on design of the dispenser. The design can be limited by e.g. size and/or payload mass, launch vehicle configuration or other design requirements.

It should be noted that seen from the side, i.e. in the radial direction, and in a two-dimensional projection, the dispenser can have an essentially cylindrical form, a conical shape or a combination thereof. Seen from above, i.e. in the longitudinal direction, the number of panels gives a polygon shape with at least three sides. The panels can be flat or curved and the panels can have an even thickness or the thickness can vary dependent on design of the dispenser.

Each panel is designed with considerable out of plane stiffness, typically a sandwich or possibly a grid plate. On this plate interfaces to separation interfaces will be integrated, typically by introducing inserts in a sandwich or just holes or threads in a machined grid plate. As the primary sizing of the panel is driven by the need for a stiff behavior of the integrated facetted tube together with sufficient out of plane stiffness for the satellite I/F points these parameters are controlled by sandwich height and panel sheet stiffness.

The design of the panels allows for integration into the final dispenser with minimal access to the external side of the panel where maximum volume is allocated to the payload (satellites).

It is preferred to design the panel attachment means so a bending moment can be transferred to conserve the bending stiffness of the panels in circumferential direction, thus avoiding local eigenmodes that can arise due to the dynamic launch environment.

As stated above, the present disclosure also relates to a dispenser payload joint for detachably attaching to each other two adjacent panels of a payload dispenser for a launch vehicle. The payload joint comprises a clamp, in turn comprising an inner clamp portion and an outer clamp portion facing the inner clamp portion. Each clamp portion comprises a through opening, wherein the payload joint comprises a bolt configured to be arranged in the through openings. Depending on how long the clamp is, a number of bolts are possible to be used. The number of through opening then corresponds to the number of bolts.

The inner clamp portion comprises a first and second inner clamp flange and an inner mid portion between the first and second inner flanges. The outer clamp portion comprises a first and second outer clamp flange and an outer mid portion between the first and second outer flanges. The payload joint further comprises a first panel end portion of a first panel comprising a first end section and a second panel end portion of a second panel comprising a second end section. The first and the second panels referred to are neighboring panels of a payload dispenser. The first end section comprises a first outer panel flange and a first inner panel flange, wherein the second end section comprises a second outer panel flange and a second inner panel flange. The first end section comprises a first contact surface formed by a portion of an outer surface of the first outer panel flange and by a portion of an outer surface of the first inner panel flange. The second end section comprises a second contact surface formed by a portion of an outer surface of the second outer panel flange and by a portion of an outer surface of the second inner panel flange. The first and second contact surfaces are abutting each other in the payload joint forming a reference plane. Furthermore;
a first inner clamp locking surface of the first inner clamp flange is arranged at a first angle to the reference plane,
a first outer clamp locking surface of the first outer clamp flange is arranged at a second angle to the reference plane, a second inner clamp locking surface of the second inner clamp flange is arranged at a third angle to the reference plane,
a second outer clamp locking surface of the second outer clamp flange is arranged at a fourth angle to the reference plane,
a first inner panel locking surface of the first inner panel flange is arranged at a fifth angle to the reference plane,
a first outer panel locking surface of the first outer panel flange is arranged at a sixth angle to the reference plane,
a second inner panel locking surface of the second inner panel flange is arranged at a seventh angle to the reference plane, and
a second outer panel locking surface of the second outer panel flange is arranged at an eight angle to the reference plane.

The angled parts of the clamp flanges together with angled parts of the panel flanges has the effect that the end sections are forced towards each other as the dispenser payload joint is tightened by pressing the inner clamp portion against the outer clamp portion by means of the bolt. This type of payload joint provides a stiff and reliable payload joint with a high capability to transfer loads between the panels. Due to the high load capability of one single joint, the total number of joints within the panel dispenser may thus be minimized. This in turn has the advantage that the time to assemble the panels is minimized. There is also the advantage of minimized man hours due to the simplicity but yet high load capacity. The joint can be disassembled by loosening or removing the bolt whereby the panel may be disconnected. The clamp flanges encloses the panel flanges and the angle gives a force vector coinciding with the extension of the bolt and a force vector pointing in a direction perpendicular to the extension of the bolt, i.e. in a direction forcing the panel end portions together. The choice of angles determines how much of the force that is directed in the direction coinciding with the extension of the bolt and in the direction perpendicular to the extension of the bolt. Hence, there are design parameters that governs how and where the pinching force is applied onto the flanges. With a smaller angle the force from the bolt is directed in greater part in the direction perpendicular to the extension of the bolt than should the angle be greater.

The first inner clamp flange is arranged against the first inner panel flange and the first angle is equal to or smaller or greater than the fifth angle. The first outer clamp flange is arranged against the first outer panel flange and the second angle is equal to or smaller or greater than the sixth angle. The second inner clamp flange is arranged against the second inner panel flange and the third angle is equal to or smaller or greater than the seventh angle. The second outer clamp flange is arranged against the second outer panel flange and the fourth angle is equal to or smaller or greater than the eight angle.

According to one example, the first, second, third and fourth angles are smaller than the interacting fifth, sixth, seventh and eight angles. The effect would then be an enhanced effect of that the first end section of the first panel end portion and the second end section of the second panel end portion, will be forcefully pressed against each other at the contact surfaces of respective end section.

According to one example, the first, second, third and fourth angles are equal to the interacting fifth, sixth, seventh and eight angles. The effect would then be an even force distribution over the locking surfaces and a more evenly distributed force pattern between the first end section of the first panel end portion and the second end section of the second panel end portion.

According to one example, the first, second, third and fourth angles are greater than the interacting fifth, sixth, seventh and eight angles. The effect would then be an enhanced effect of that the first end section of the first panel end portion and the second end section of the second panel end portion, will be forcefully pressed against each other at the contact surfaces of respective end section.

It should be noted that further examples are possible with different angles. For example, the outer clamp portion can have different angles compared to the inner clamp portion. Furthermore, the outer clamp portion and/or the inner clamp portion can have different angles with relation to different clamp locking surfaces. The angles in the clamp flanges can be varied in a corresponding way as in the examples above.

The panel flanges have an extension in the longitudinal direction, the lateral direction and also in the thickness direction. The clamp flanges have an extension in the longitudinal direction, the lateral direction and also in the thickness direction. According to one example, the panel flanges have an extension in the thickness direction being equal to the clamp flanges. This has the advantage that the mid portion provided between the flanges can contact the outer surface of the panel flange such that the panel flanges becomes aligned due to the force from the opposing mid portions. According to one example, the panel flanges have an extension in the thickness direction being smaller than the clamp flanges. This has the advantage that the outer most portions of the clamp flanges can contact an outer surface of the panel such that the panel flanges becomes aligned due to the force from the opposing clamp flanges. According to one example, the panel flanges have an extension in the thickness direction being longer than the clamp flanges. This has the advantage that the mid portion provided between the flanges can contact the outer surface of the panel flange such that the panel flanges becomes aligned due to the force from the opposing mid portions. It should be noted that the choice of angles also have a bearing on how much force that the clamp flanges can apply on the panel flanges in a direction perpendicular to a bolt having an extension through the clamp portions, i.e. in a direction forcing the panel end portion of the panel flanges together.

According to another exemplary aspect of the present invention the first end section and the second end sections of the panels comprise cooperating channels forming a through opening for receiving the bolt of the payload joint. Should more than one bolt be used then the panels would comprise corresponding number of through openings.

According to one exemplary aspect of the present disclosure at least the inner clamp portion comprises a threaded through opening for allowing an at least partly threaded bolt to be threaded in the threaded opening.

This exemplary aspect of the present disclosure has the exemplary advantage that no separate bolt nut is needed to assemble the dispenser dispenser payload joint.

Hence, according to one example of the present disclosure the bolt is threaded, whereby the dispenser payload joint may be assembled by allowing the threaded bolt to pass through the through openings of the clamps and cooperating channels and threading an interacting bolt nut onto the bolt, whereby the dispenser payload joint can be tightened.

Advantages

The concept makes use of the structural mass in an effective way. All mass is contributing with stiffness both during integration and during launch. Hence the concept is mass effective.

The dispenser is easy transportable in flat packages before integration, i.e. assembly of the dispenser.

The structural design becomes modular; a panel can just be replaced in case of damages, which minimizes risk.

The tooling for the dispenser is much simplified since no layup tool with several months lead time is needed, simple flat panels is sufficient. Saves time and cost.

No machining of an oversized central cylinder is required, simplifies logistics and saves machining costs.

No big and expensive assembly rig is needed. The interface points, hereinafter called I/F points, on the panels are machined to high precision during panel manufacturing with simple drill jigs. This saves tooling costs and assembly time and removes the need for liquid shimming.

A multi sided dispenser will inherently have stiff I/F points in the corners simplifying the interface towards a launch adapter.

Although the primary approach is to aim at a mass optimized carbon fiber sandwich design the concept works very well with a grid panel design providing significant cost savings at the expense of mass. As many constellation launces will be strictly volume driven due to satellite size, the extra mass may well be fully acceptable.

The use of a flat panel with full freedom to locate the I/F point anywhere on the plane, the design can be used both for the classical 4-bolted I/F used in most dispensers today, but also for mounting of a small clamp band system.

A dispenser payload joint according to the present disclosure has the exemplary effect that a reliable and rigid means for detachably attaching panels of a payload dispenser is provided.

BRIEF DESCRIPTION OF DRAWINGS

The disclosure will be described in greater detail in the following, with reference to the attached drawings, in which FIG. 1 schematically shows a top view of a payload dispenser;

FIG. 4a schematically shows a side view of a panel and a payload before assembly;

FIG. 4b schematically shows a side view of a panel and a payload after assembly;

FIG. 4c schematically shows a front view of a panel and a payload;

DESCRIPTION OF EXAMPLE EMBODIMENTS

Figure 1:
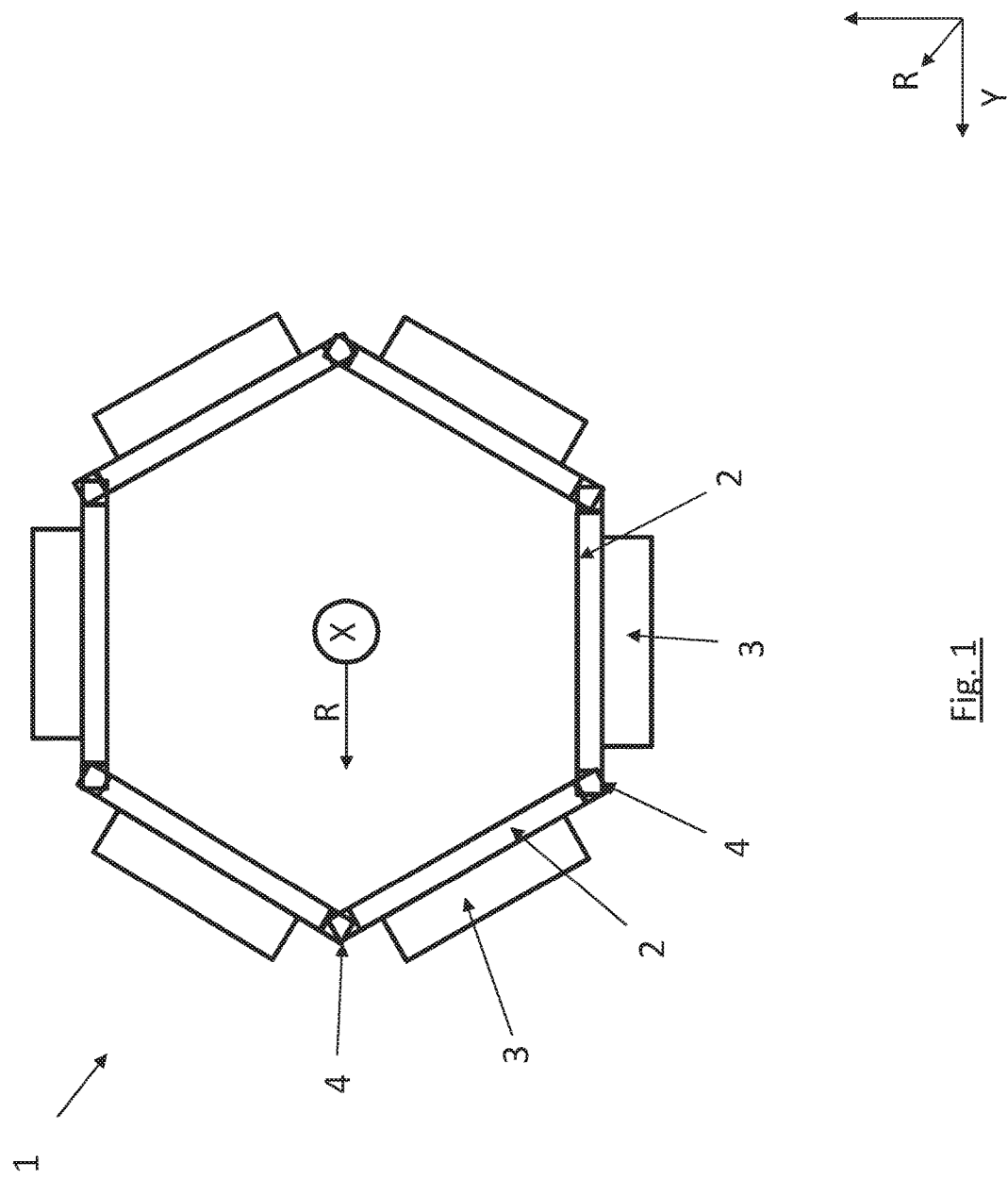

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIGS. 14-23 show a payload joint 10 according to the invention for detachably attaching to each other two adjacent construction elements 2 for a spacecraft or launch vehicle. The details of the payload joint will be explained in connection to FIGS. 19-23.

FIGS. 1-13 schematically shows a dispenser 1 comprising multiple panels 2 attached to each other forming the payload dispenser 1. FIGS. 19-23 schematically show the payload joint 10 according to FIGS. 14-17 used for connecting two adjacent panels.

FIGS. 18a-18c schematically show the payload joint 10 according to FIGS. 19-23 used for connecting a payload 3 to a panel 2. The panel 2 can be a panel according to FIGS. 1-13, or can be a different panel forming the dispenser 1. The panel can be flat like in FIGS. 1-13 or rounded or the panel can be one single object forming the dispenser 1. The panel can also be any suitable body of a spacecraft and/or launch vehicle for attaching a payload.

With reference to FIGS. 19-23, the payload joint 10 comprises a clamp 11, comprising an inner clamp portion 11a and an outer clamp portion 11b facing the inner clamp portion 11a, each clamp portion 11a, 11b comprising a through opening 8, wherein the payload joint 10 comprises
a bolt 7, configured to be arranged in the through openings 8, wherein the inner clamp portion 11a comprises a first and second inner clamp flange 12a1, 12a2 and an inner mid portion 13a between the first and second inner flanges 12a1, 12a2, wherein
the outer clamp portion 11b comprises a first and second outer clamp flange 12b1, 12b2 and an outer mid portion 13b between the first and second outer flanges 12b1, 12b2,
wherein the payload joint 10 comprises a first construction element end portion 25' of a first construction element 2' comprising a first end section 9' and
a second construction element end portion 25" of a second construction element 2" comprising a second end section 9"', and wherein the first end section 9' comprises a first outer construction element flange 14b1 and a first inner construction element flange 14a1, wherein the second end section 9"' comprises a second outer construction element flange 14b2 and a second inner construction element flange 14a2,
wherein the first end section 9' comprises a first contact surface 31' formed by a portion of an outer surface 30' of the first outer construction element flange 14b1 and by a portion of an outer surface 30' of the first inner construction element flange 14a1, and wherein the second end section 9"' comprises a second contact surface 31' formed by a portion of an outer surface 30" of the second outer construction element flange 14b2 and by a portion of an outer surface 30" of the second inner construction element flange 14a2,
wherein the first and second contact surfaces 31', 31" are abutting each other in the payload joint 10 forming a reference plane RP,
wherein a first inner clamp locking surface 20a1 of the first inner clamp flange 12a1 is arranged at a first angle A1 to the reference plane RP,
wherein a first outer clamp locking surface 20b1 of the first outer clamp flange 12b1 is arranged at a second angle A2 to the reference plane RP,
wherein a second inner clamp locking surface 20a2 of the second inner clamp flange 12a2 is arranged at a third angle A3 to the reference plane RP,
wherein a second outer clamp locking surface 20b2 of the second outer clamp flange 12b2 is arranged at a fourth angle A4 to the reference plane RP,
wherein a first inner construction element locking surface 21a1 of the first inner construction element flange 14a1 is arranged at a fifth angle A5 to the reference plane RP,
wherein a first outer construction element locking surface 21b1 of the first outer construction element flange 14b1 is arranged at a sixth angle A6 to the reference plane RP,
wherein a second inner construction element locking surface 21a2 of the second inner construction element flange 14a2 is arranged at a seventh angle A7 to the reference plane RP,
wherein a second outer construction element locking surface 21b2 of the second outer construction element flange 14b2 is arranged at an eight angle A8 to the reference plane RP,
wherein the payload joint 10 comprises a bolt cutter 101 comprising a cutting device 102 arranged at a cutting angle CA towards the bolt 7 and a driving device 103 arranged in connection to the cutting device 102 and arranged to drive the cutting device 102 towards the bolt with a shear force that breaks and separates the bolt 7 into two or more pieces, wherein the cutting angle CA is defined with reference to a normal to a length extension of the bolt 7 and being zero degrees or close to zero degrees.

FIG. 1 schematically shows a top view of a payload dispenser 1 for a launch vehicle. The dispenser 1 comprises a panel 2 and a payload 3. The dispenser 1 comprises a plurality of panels 2 wherein at least one panel 2 comprises at least one payload 3 mounted onto the panel 2. FIG. 1 shows that the panels 2 are attachable to each other via attachment means 4 forming a self-supporting dispenser 1. The attachment means 4 comprises at least one dispenser payload joint 10, as will be disclosed more in detail below.

FIG. 1 shows six panels 2 attached to each other. However, any plurality of panels 2 is possible but with a minimum of three panels in order to form a dispenser 1.

Figure 6:
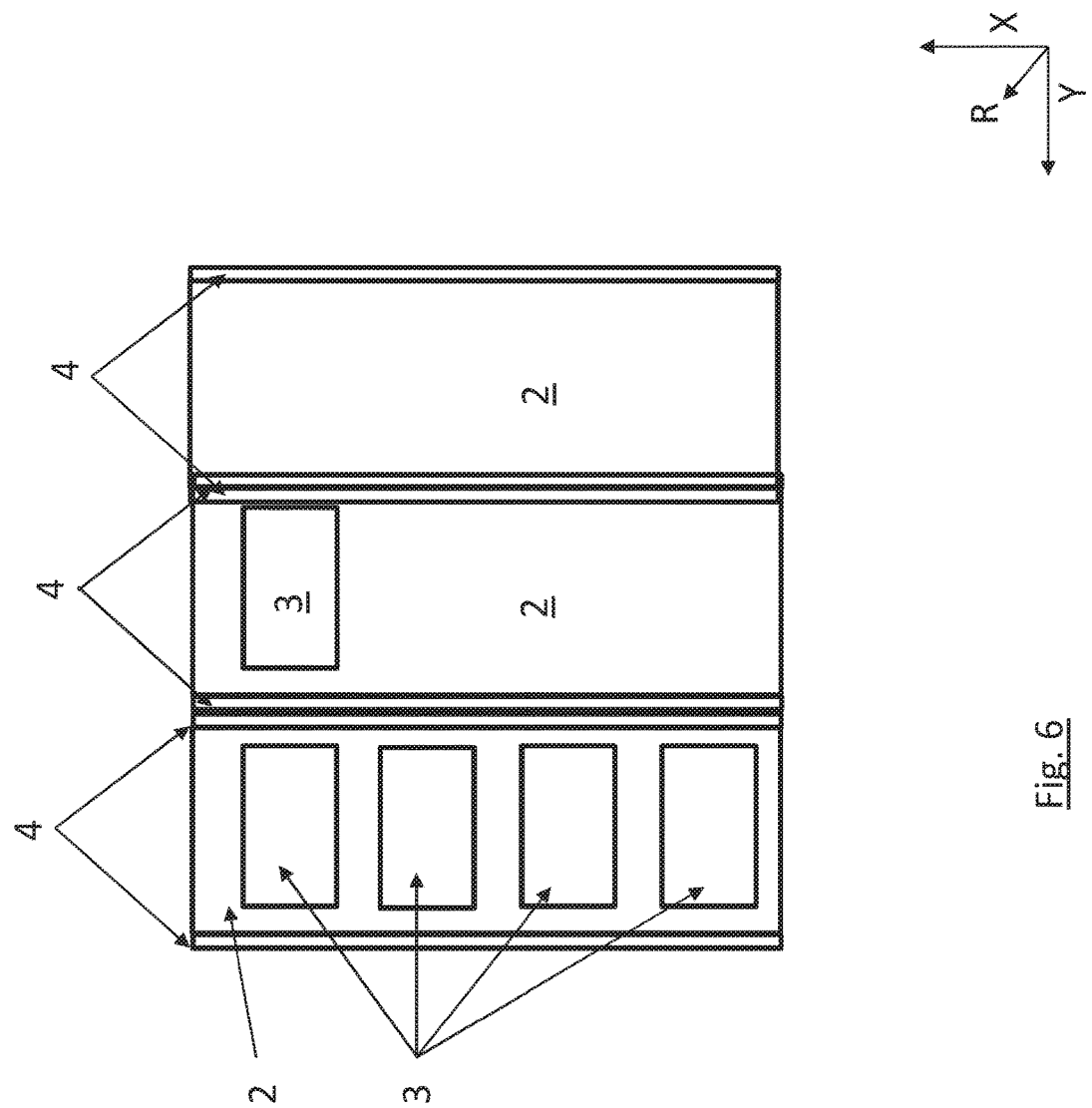
FIG. 6 schematically shows a front view of three panels attached to each other.

FIG. 1 shows that each panel 2 comprises at least one payload 3. According to another example shown in FIG. 6, one of the panels 2 in the dispenser 1 can be without any payload 3 while other panels 2 carry payload. Furthermore, as shown in FIGS. 2a-2b and 6, at least one panel 2 comprises a plurality of payloads 3.

According to one example, the payload 3 is a satellite.

In FIGS. 1-8, the payload dispenser 1 has an extension in a longitudinal direction X and in a radial direction R. Each panel 2 comprises attachment means in the longitudinal direction X being attachable to neighbouring panels 2.

The payload dispenser 1 is delimited in the radial direction R by the panels 2 forming an envelope surface and the panels 2 are attachable to each other in an interface running in the longitudinal direction X.

The attachment means 4 are arranged to lock in position with relation to each other to allow for the self-supporting dispenser 1.

The dispenser 1 is a primary load bearing structure that can carry one or more payloads. The payload can be arranged to be separated from the dispenser in a controlled manner via separation means. For this to happen, the payload dispenser comprises additional equipment connecting the separation means (not shown) to a control device (not shown). The control device is arranged to control the separation means to separate and eject the payload at a certain point in time and in a pre-determined direction.

FIG. 2a schematically shows a side view of a panel and payloads before assembly.

FIG. 2b schematically shows a side view of a panel and payloads after assembly. FIGS. 2a and 2b shows that the payload 3 is mounted onto the panel 2 before assembly of the dispenser 1.

Figure 2C:
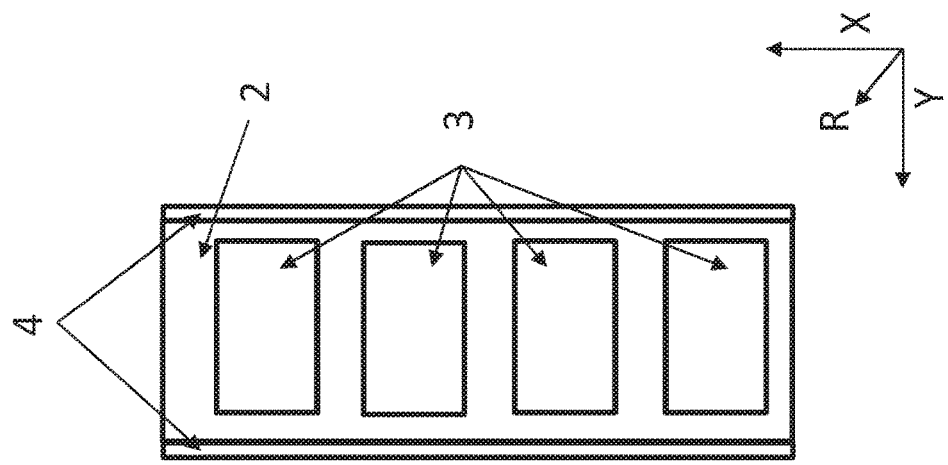
FIG. 2c schematically shows a front view of a panel and payloads.
Figure 2B:
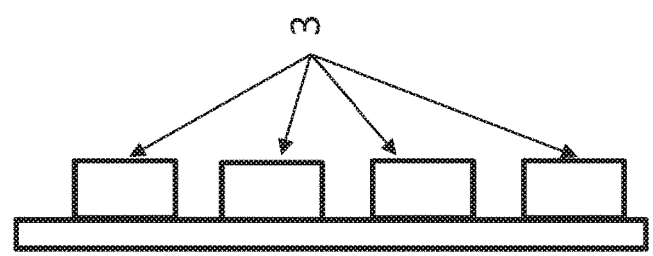
FIG. 2b schematically shows a side view of a panel and payloads after assembly.
Figure 2A:
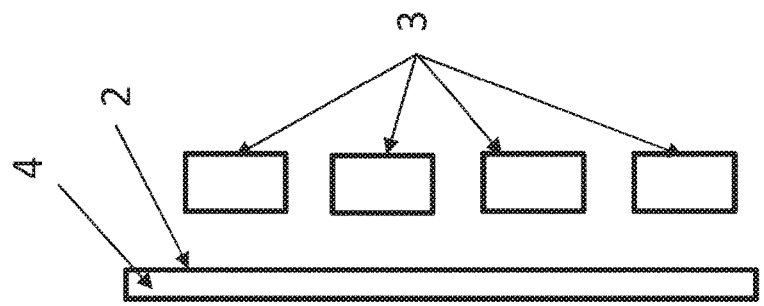
FIG. 2a schematically shows a side view of a panel and payloads before assembly.

FIG. 2c schematically shows a front view of a panel and payloads according to FIGS. 2a and 2b.

Figure 3:
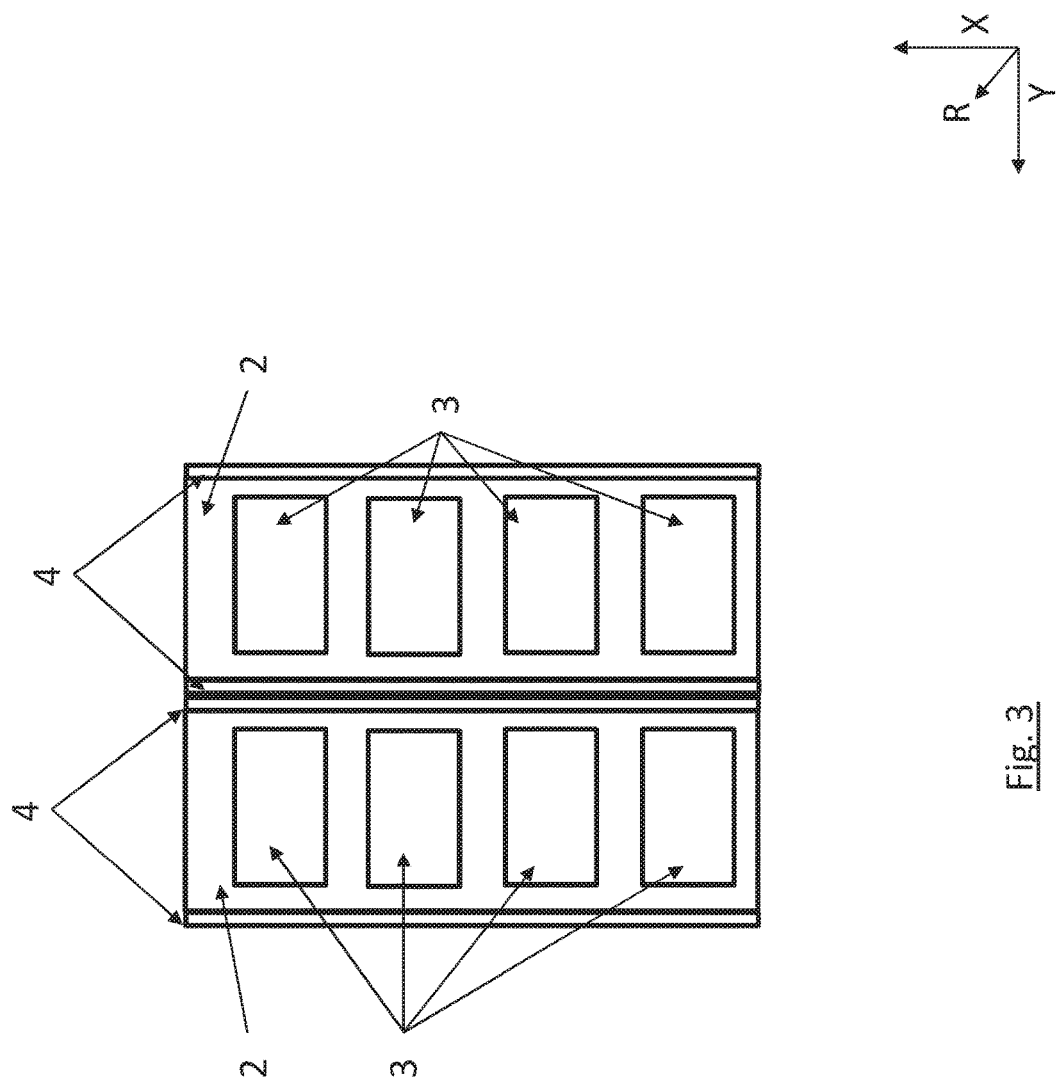
FIG. 3 schematically shows a front view of two panels attached to each other.
Figure 7:
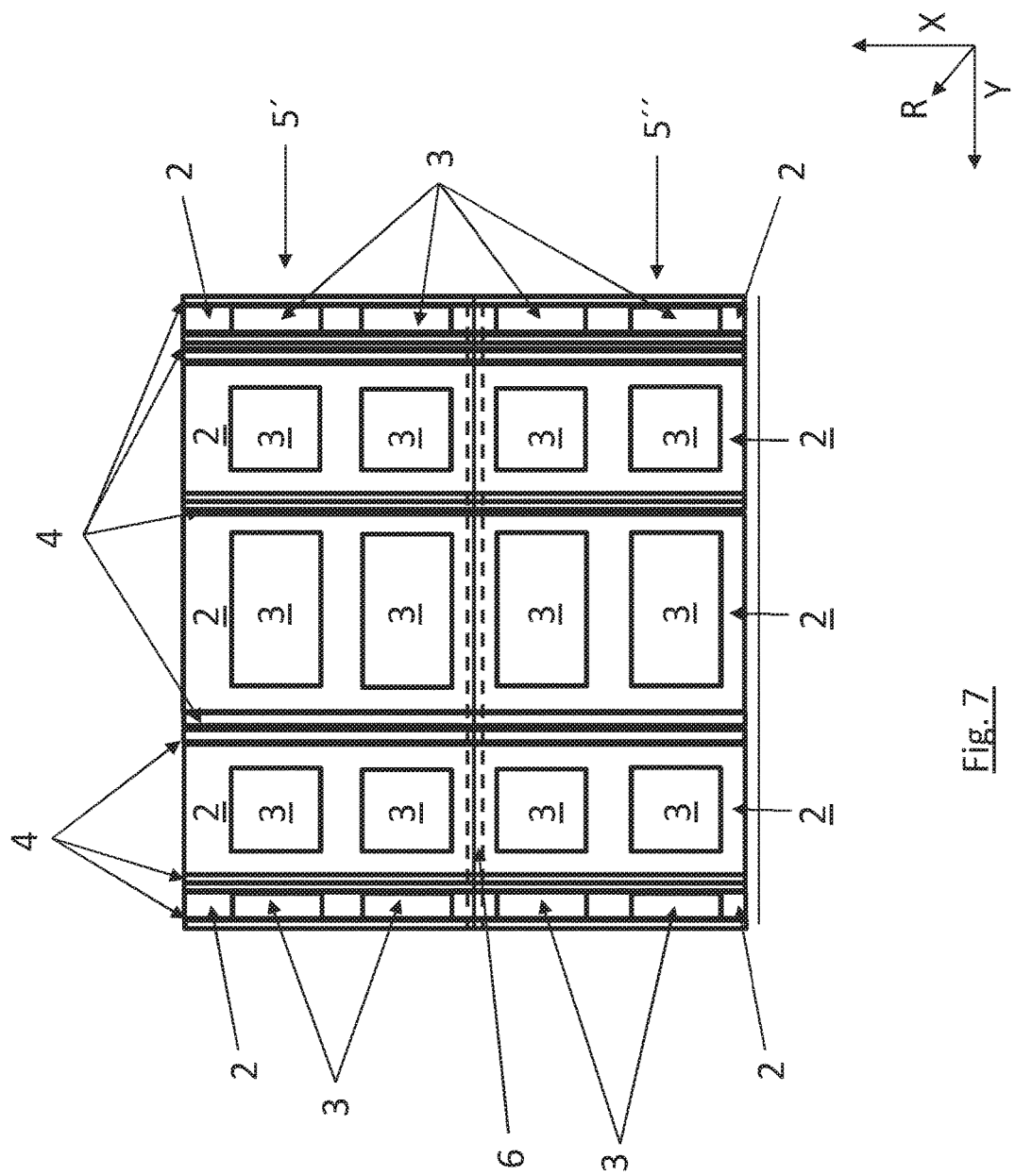
FIG. 7 schematically shows a side view of an assembled payload dispenser.

FIG. 3 schematically shows a front view of two panels attached to each other. FIG. 3 shows that the payload dispenser 1 is delimited in a lateral direction Y by the panels 2. In FIG. 3, each panel 2 has an unbroken extension in the longitudinal direction X. However, as can be seen in FIG. 7, the panels 2 can be made from panel portions 5', 5".

FIG. 4a schematically shows a side view of a panel 2 and a payload 3 before assembly, FIG. 4b schematically shows a side view of a panel 2 and a payload 3 after assembly and FIG. 4c schematically shows a front view of a panel 2 and a payload 3. FIG. 4a-4c shows the same as FIG. 2a-2c but with the difference that only one payload 3 is mounted onto the panel 2.

Figure 5:
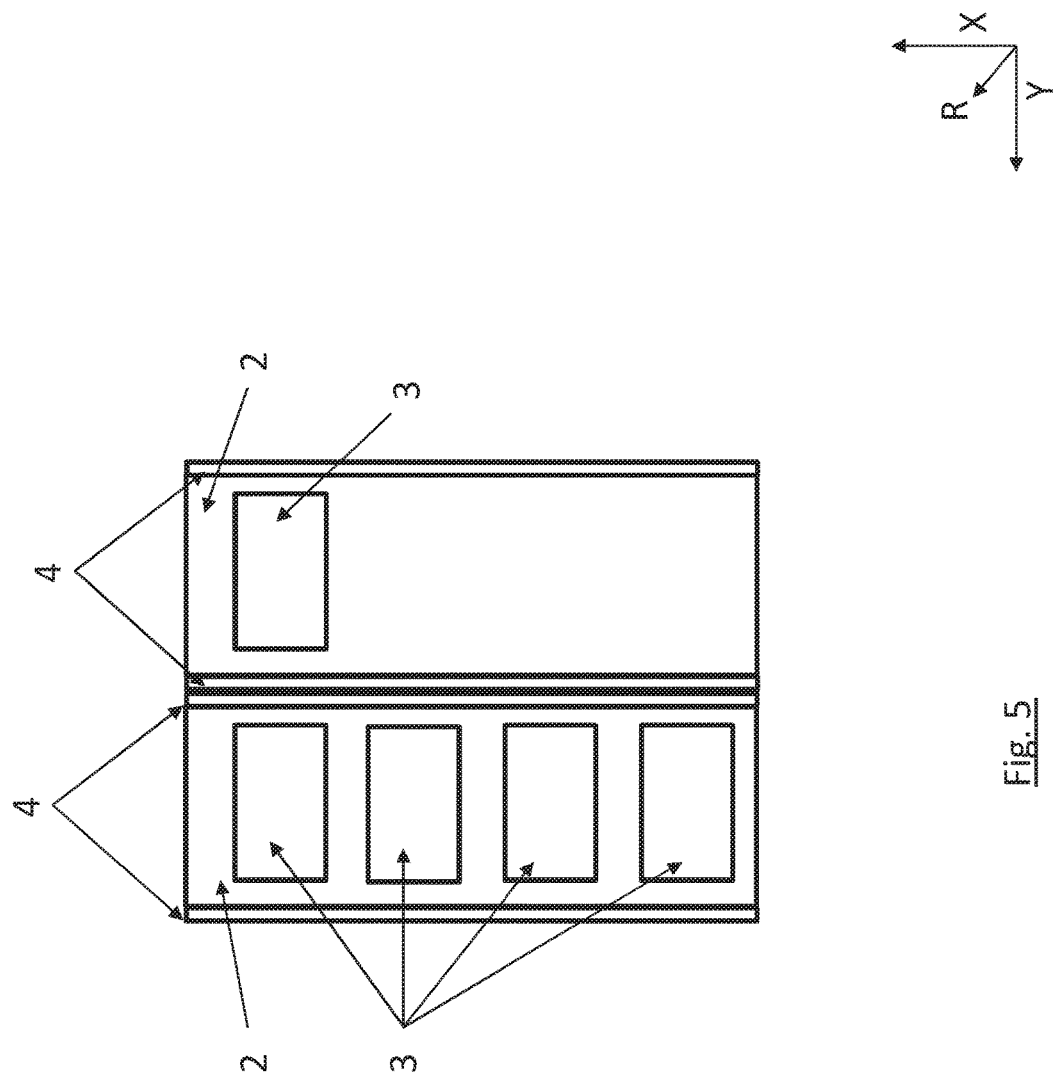
FIG. 5 schematically shows a front view of two panels attached to each other.

FIG. 5 schematically shows a front view of two panels 2 attached to each other. One panel 2 is identical to what is shown in FIGS. 2a-2c and one panel is identical to what is shown in FIGS. 4a-4c. FIG. 5 thus only shows an example of that panels 2 with different amount of payloads can be combined.

FIG. 6 schematically shows a front view of three panels 2 attached to each other, and in addition to the two panels 2 in FIG. 5, there is also a third panel attached to the other two without any payload to further broaden the example of the possibility to attach differently equipped panels to each other.

FIG. 7 schematically shows a side view of an assembled payload dispenser. FIG. 7 shows that at least one panel 2 comprises panel portions 5', 5" attached to each other forming the panel 2. In FIG. 7 the panel portions 5', 5" are connected to each other in the longitudinal direction X and in the lateral direction Y. The panels 2 are attached to each other via the longitudinally extending attachment means 4 and the panel portions 5', 5" are fixedly attached to each other along the laterally extending attachment means 6. The attachment means 4, 6 are positioned in the envelope surface of the dispenser, which means that the lateral extension refers to a direction perpendicular to the longitudinal direction but along the envelope surface. In FIG. 7 the dispenser is cylindrical, but different shapes are possible. However, common for all shapes are that the attachment means 4, 6 are positioned in the envelope surface of the dispenser 1. The attachment means 4, 6 may e.g. be in form of at least one dispenser payload joint 10, as will be disclosed more in detail below.

When the panels 2 are viewed separately as in FIGS. 2a-2c and 4a-4c, or attached to each other but in a flat state as in FIGS. 3, 5 and 6, then the lateral direction Y is perpendicular to the longitudinal direction as in Cartesian coordinates.

Figure 8:
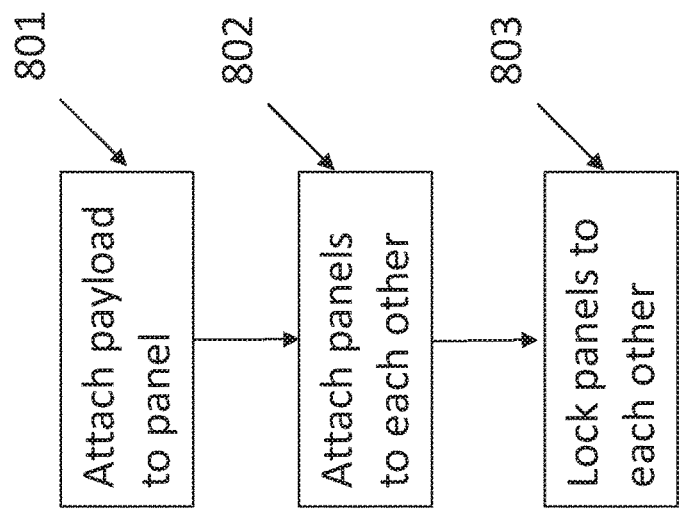
FIG. 8 schematically shows a flow chart of a method for assembly of the payload dispenser.

FIG. 8 schematically shows a flow chart of a method for assembly of the payload dispenser.

Box 801 relates to the step of mounting at least one payload 3 onto one panel 2. The step of mounting the at least one payload 3 onto one panel is advantageously done before assembly of the panels 2.

Box 802 relates to the step of attaching the panels 2 to each other via longitudinally extending attachment means 4.

Box 803 relates to the step of locking the attachment means 4 in position to hinder movement between the panels 2 forming a self-supporting dispenser 1.

As described above, the panels 2 can be made from panel portions 5', 5" and the panel portions are connected to each other via laterally extending attachment means 6. The panels 2 are attached to each other via the longitudinally extending attachment means 4. The method steps in connection to Boxes 802 and 803 can then be described as follows:

Box 802 relates to the step of attaching the panels 2 to each other via longitudinally extending attachment means 4. According to one example, the panel portions 5', 5" are attached to each other via the laterally extending attachment means 6 before the panels 2 are attached to each other via the longitudinally extending attachment means 4. According to another example, panel portions 5', 5" are attached to each other via the longitudinally extending attachment means 4 forming dispenser portions and the panel portions, i.e. the panel portions 5', 5" are then attached to each other via the laterally extending attachment means 6. In the latter example the dispenser can be built in sections where the dispenser portions are positioned on top of each other in the height direction, i.e. the longitudinal direction.

Box 803 relates to the step of locking the attachment means 4, 6 in position to hinder movement between the panels 2 forming the self-supporting dispenser 1.

Figure 9:
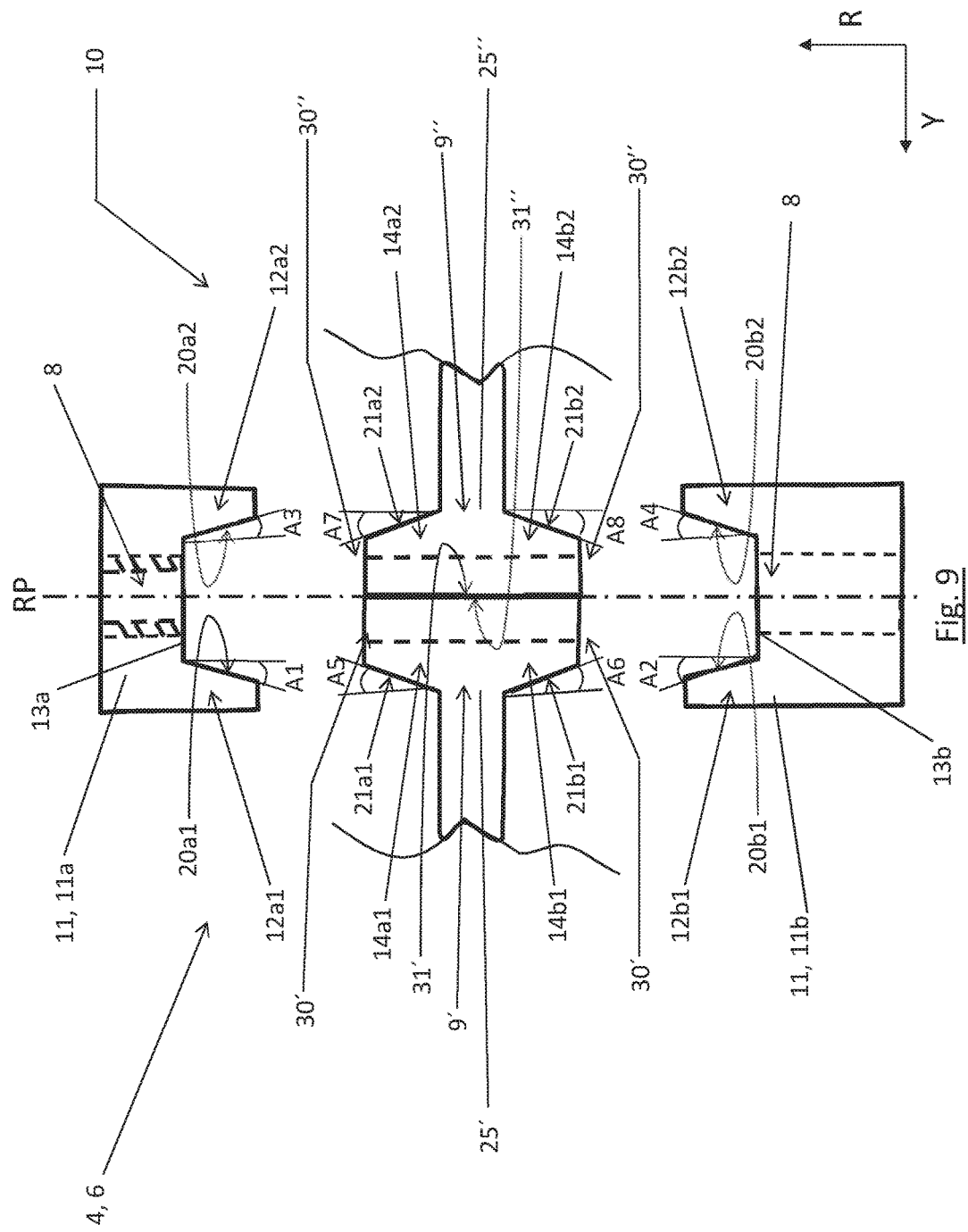
FIG. 9 schematically shows an enlarged view of an attachment means in form of a disassembled dispenser payload joint.

FIG. 9 schematically shows an enlarged view of an example of an attachment means 4, 6 in form of a disassembled dispenser payload joint 10. The dispenser payload joint 10, configured for detachably attach two adjacent panels of a payload dispenser to each other, comprises a clamp 11, comprising an inner clamp portion 11a and an outer clamp portion 11b. The outer clamp portion 11b faces the inner clamp portion 11a. Each clamp portion 11a, 11b comprise a through opening 8. The payload joint 10 further comprises a bolt, not shown in FIG. 9, configured to be arranged in the through openings 8.

The inner clamp portion 11a comprises a first and second inner clamp flange 12a1, 12a2, and an inner mid portion 13a provided between the first and second inner flanges 12a1, 12a2. The outer clamp portion 11b comprises a first and second outer clamp flange 12b1, 12b2, and an outer mid portion 13b provided between the first and second outer flanges 12b1, 12b2.

The payload joint 10 further comprises a first panel end portion 25' of a first panel, comprising a first end section 9', and a second panel end portion 25" of a second panel comprising a second end section 9". The first and the second panels are neighboring, or adjacently arranged, panels of a payload dispenser. The first end section 9' comprises a first outer panel flange 14b1 and a first inner panel flange 14a1, and the second end section 9" comprises a second outer panel flange 14b2 and a second inner panel flange 14a2.

The first end section 9' comprises a first contact surface 31' formed by a portion of an outer surface 30' of the first outer panel flange 14b1 and by a portion of an outer surface 30' of the first inner panel flange 14a1, and wherein the second end section 9" comprises a second contact surface 31" formed by a portion of an outer surface 30" of the second outer panel flange 14b2 and by a portion of an outer surface 30" of the second inner panel flange 14a2, wherein the first and second contact surfaces 31', 31" are abutting each other in the payload joint 10, forming a reference plane RP. The first and second surfaces need not be flat per se, but can be curved or may comprise steps or step like elevations that takes up forces in a chosen direction. The reference plane RP is then taken along a line running from edge to edge of the contact surfaces.

An essentially planar first inner clamp locking surface 20a1 of the first inner clamp flange 12a1 is arranged at a first angle A1 in relation to the reference plane RP.

An essentially planar first outer clamp locking surface 20b1 of the first outer clamp flange 12b1 is arranged at a second angle A2 in relation to the reference plane RP.

An essentially planar locking second inner clamp locking surface 20a2 of the second inner clamp flange 12a2 is arranged at a third angle A3 in relation to the reference plane RP.

An essentially planar second outer clamp locking surface 21b2 of the second outer clamp flange 12b2 is arranged at a fourth angle A4 in relation to the reference plane RP.

An essentially planar first inner panel locking surface 21a1 of the first inner panel flange 14a1 is arranged at a fifth angle A5 in relation to the reference plane RP.

An essentially planar first outer panel locking surface 21b1 of the first outer panel flange 14b1 is arranged at a sixth angle A6 in relation to the reference plane RP.

An essentially planar second inner panel locking surface 21a2 of the second inner panel flange 14a2 is arranged at a seventh angle A7 in relation to the reference plane RP.

An essentially planar second outer locking surface 21b2 of the second outer panel flange 14b2 is arranged at an eight angle A8 in relation to the reference plane RP.

The first inner clamp flange 12a1 is arranged against the first inner panel flange 14a1 and the first angle A1 is equal to or smaller or greater than the fifth angle A5.

The first outer clamp flange 12b1 is arranged against the first outer panel flange 14b1 and the second angle A2 is equal to or smaller or greater than the sixth angle A6.

The second inner clamp flange 12a2 is arranged against the second inner panel flange 14a2 and the third angle A3 is equal to or smaller or greater than the seventh angle A7.

The second outer clamp flange 12b2 is arranged against the second outer panel flange 14b2 and the fourth angle A4 is equal to or smaller or greater than the eight angle A8.

The herein disclosed example of a dispenser payload joint 10 may be used both as longitudinal attachment means 4 and as lateral attachment means 6.

Figure 10:
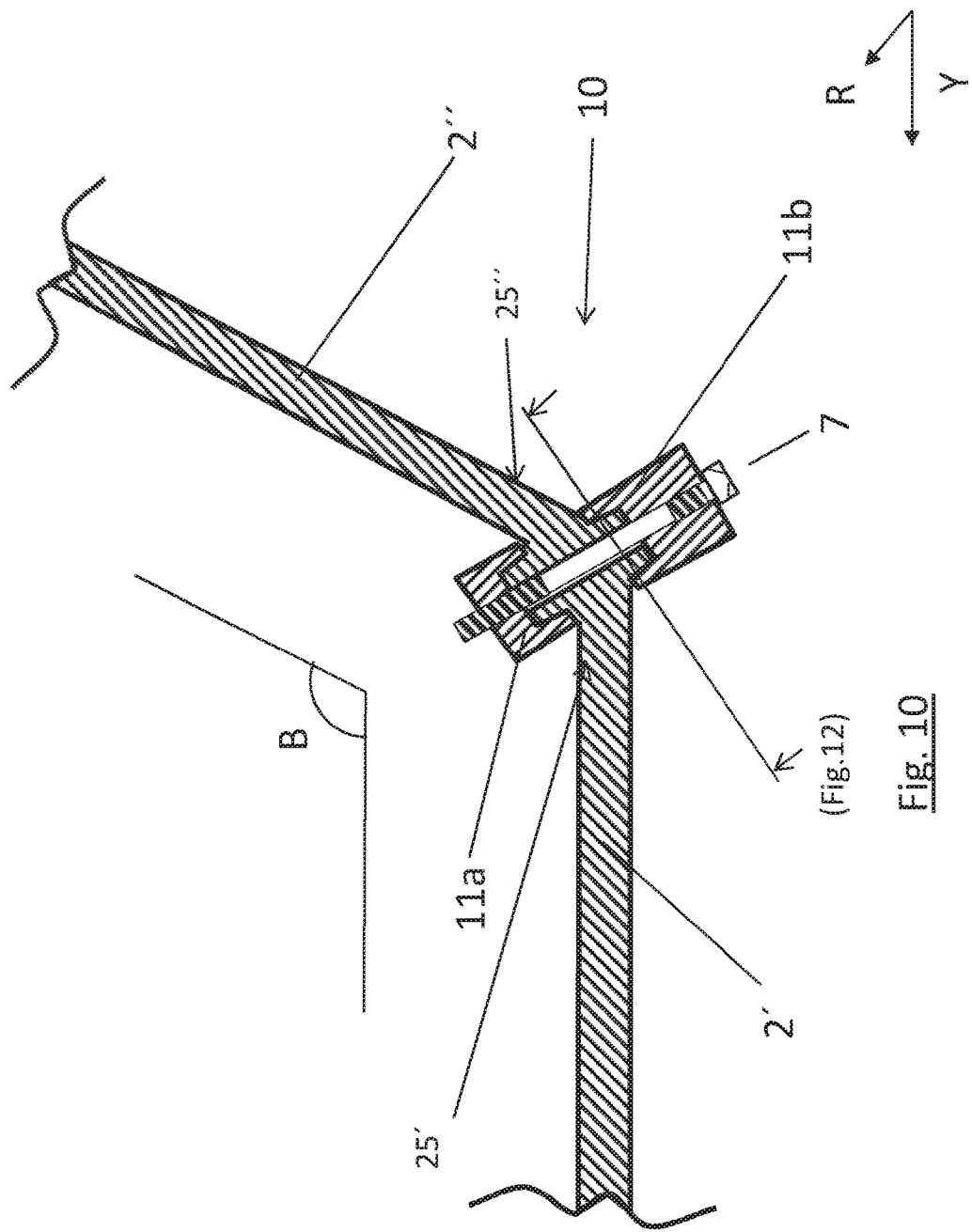
FIG. 10 schematically shows an example of an attachment means in form of an assembled dispenser payload joint.

FIG. 10 schematically shows an example of an attachment means in form of an assembled dispenser payload joint 10. In the example shown in FIG. 10 the dispenser payload joint 10 is arranged to lock two neighboring, i.e. adjacently arranged, essentially planar panels 2', 2" together in longitudinal direction X at an angle B.

However, the payload dispenser 10 may also be used to connect panels to each other, also referred to as arrange, assemble or lock panels to each other, at larger or narrower angles than angle B. Also, the panels do not necessarily have to be essentially planar as in the example shown in FIG. 10. According to other realizations the panels may e.g. be slightly bent outwardly.

In FIG. 10 two neighboring panels 2', 2" are connected to each other in the longitudinal direction X, but, as previously disclosed, the dispenser payload joint 10 may also be used to connect two neighboring panels in lateral direction Y.

Further, in the example shown in FIG. 10 the dispenser payload joint 10 has an essentially rectangular outer shape when being assembled and thereby connecting the panels 2', 2" to each other such that a dispenser is formed.

However, this is just one example of a payload dispenser 10 according to the present disclosure. Other configurations, necessarily not forming an essentially rectangular dispenser payload joint, are also possible. The dispenser payload joint may e.g. adopt an essentially trapezoid, hexagonal or octagonal outer shape.

The outer shape of the dispenser payload joint and the angle at which two neighboring panels are connected to each other are e.g. dependent on the configuration of the dispenser and the configuration on the panels. The size of the panels, the number of panels, the size of the dispenser, the form of the dispenser, if the panels e.g. are essentially planar or outwardly bulging, i.e. if the panels are slightly bent outwardly, if the panels are connected in longitudinal or lateral direction etc. are examples of conditions that may affect the outer shape of the dispenser payload joint and the angle at which two neighboring panels are connected.

Figure 11:
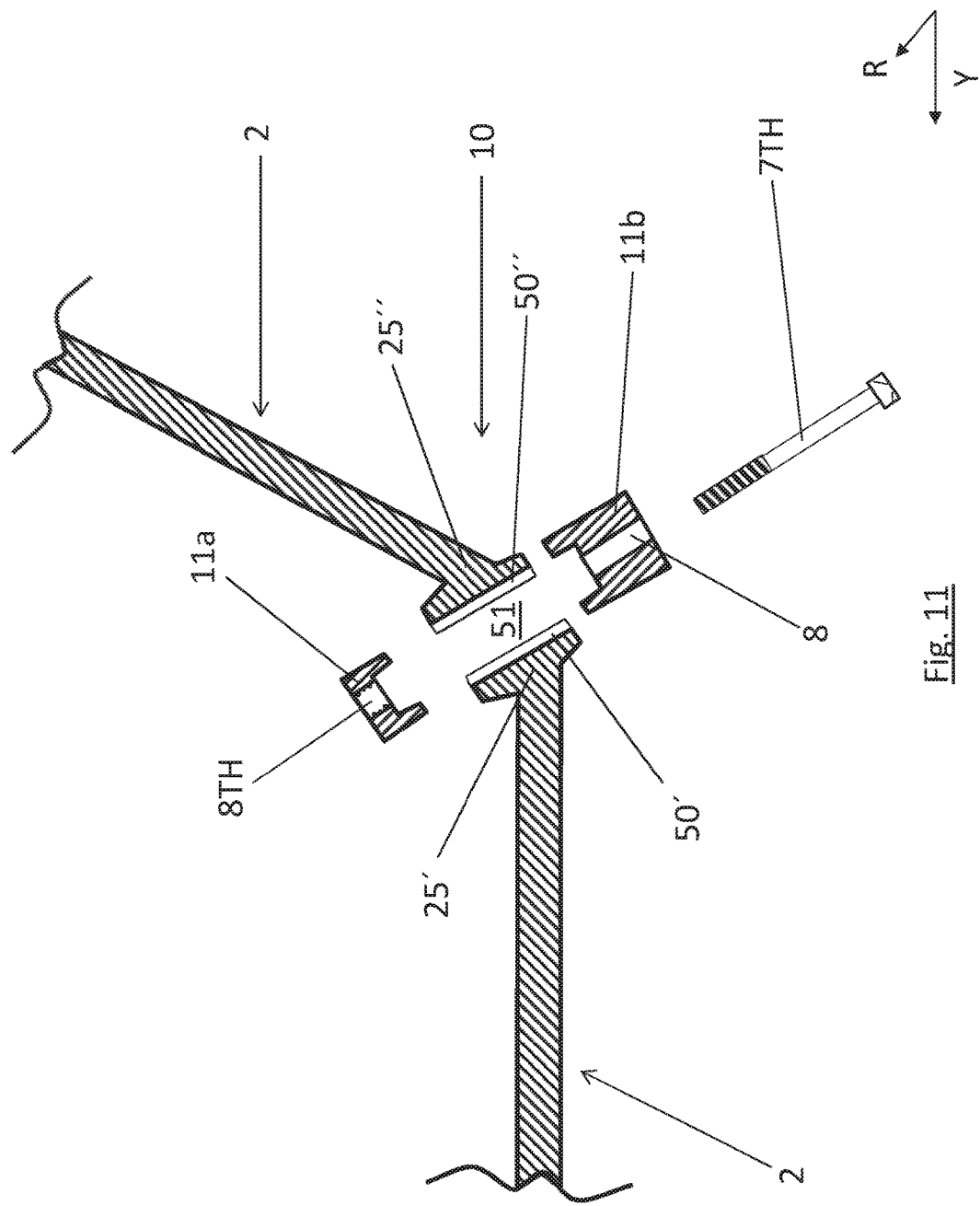
FIG. 11 schematically shows an example of an attachment means in form of a disassembled dispenser payload joint.

FIG. 11 schematically shows an example of an attachment means in form of a disassembled dispenser payload joint 10. According to the exemplary embodiment of a dispenser payload joint 10 disclosed in FIG. 11, the first panel end portion 25' and the second panel end portion 25" of the panels 2 comprises cooperating channels 50', 50" forming a through opening 51 configured for receiving a threaded bolt 7TH of the payload joint 10.

FIG. 11 further shows that the inner clamp portion 11a comprises threaded through opening 8TH, allowing the threaded bolt 7TH to be threaded in the threaded opening 8TH.

In FIG. 11 the through opening 8 of the outer clamp portion 11b is not threaded. However, according to other realizations, not shown, the outer clamp portion 11b may comprise a threaded through opening instead of the inner clamp portion, whereby by the bolt is configured correspondingly.

Figure 12:
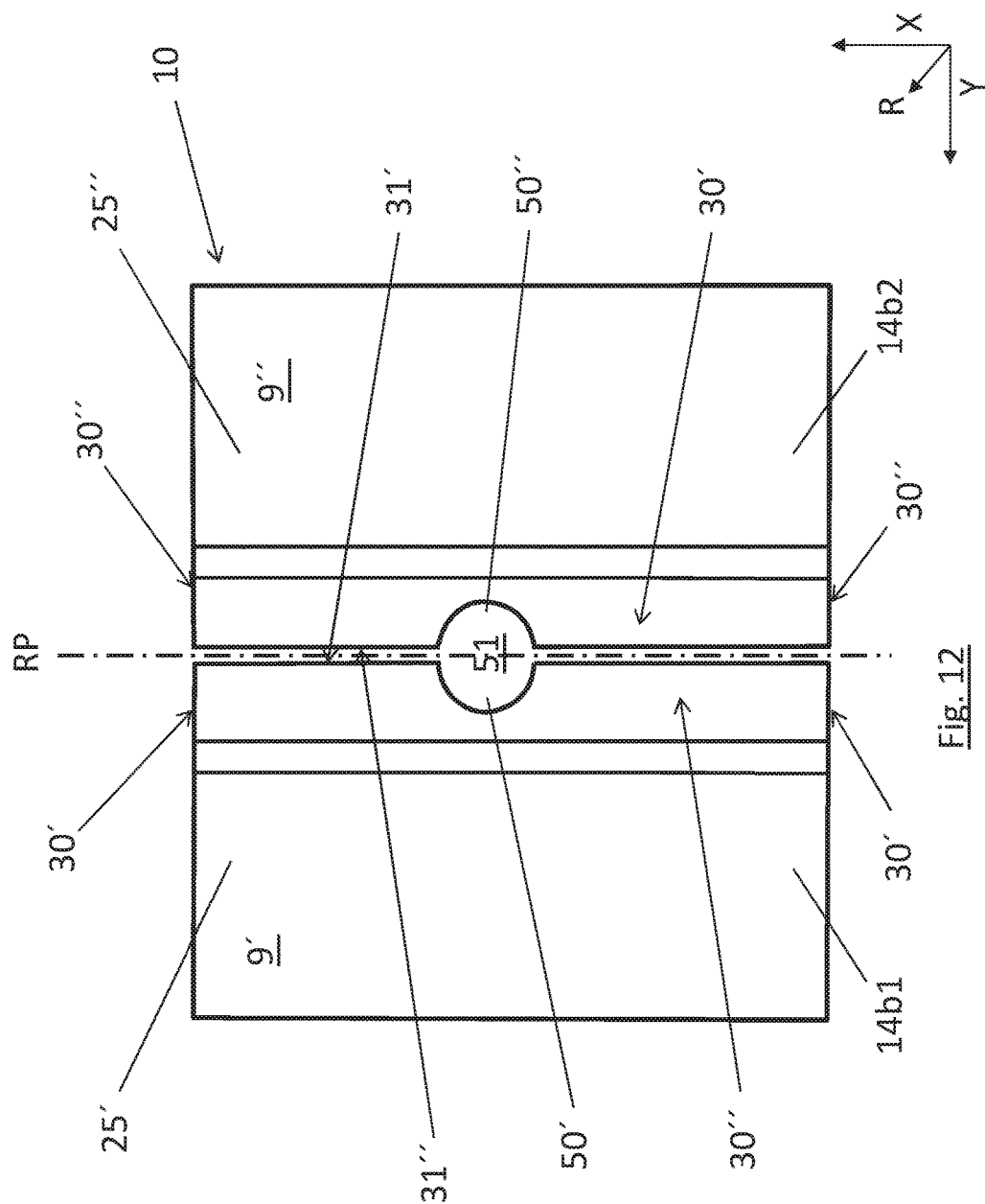
FIG. 12 schematically shows a side view of panel flanges forming through opening, FIG. 13 schematically shows a cut away side view of interacting locking surfaces.

FIG. 12 schematically shows a side view of a first outer panel flange 14b1, of a first end section 9' of a panel end portion 25', and of a second outer panel flange 14b2, of a second end section 9" of a panel end portion 25", forming through opening 51, wherein the through opening is configured to receive a bolt (not shown).

The first end section 9' comprises a first contact surface 31' formed by a portion of an outer surface 30' of the first outer panel flange 14b1 and by a portion of an outer surface 30' of the first inner panel flange. The second end section 9" comprises a second contact surface 31" formed by a portion of an outer surface 30' of the second outer panel flange 14b2 and by a portion of an outer surface 30" of the second inner panel flange. When the dispenser payload joint is assembled the first and second contact surfaces 31', 31" are abutting each other, forming a reference plane RP.

Figure 13:
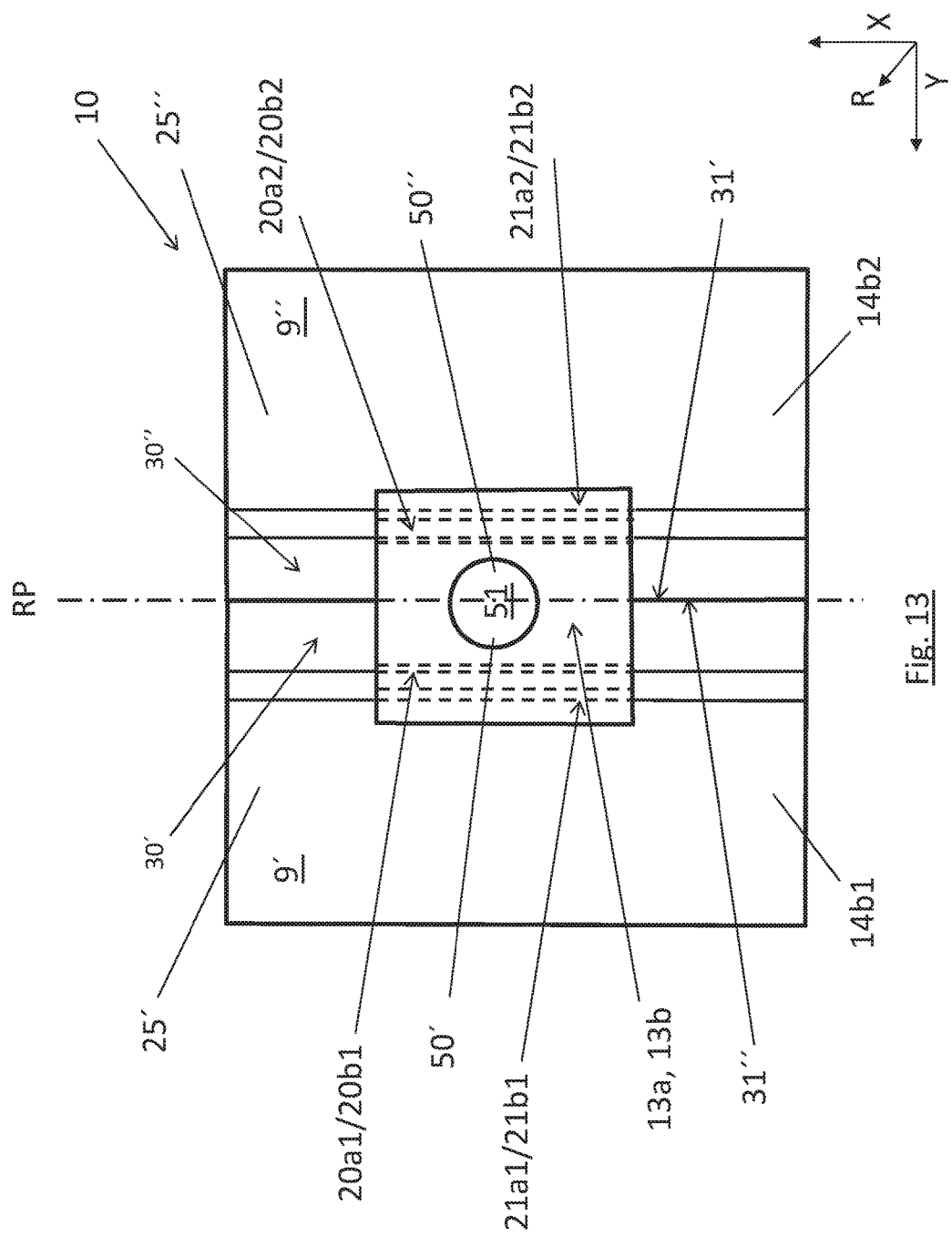

FIG. 13 schematically shows a cut away side view of interacting locking surfaces. In FIG. 13 a first outer panel flange 14b1, of a first end section 9', and a second outer panel flanges 14b2, of a second end section 9" is shown.

FIG. 13 shows, as in FIG. 12, the first end section 9' comprising a first contact surface 31' formed by a portion of an outer surface 30' of the first outer panel flange 14b1 and by a portion of an outer surface 30' of the first inner panel flange. The second end section 9" comprises a second contact surface 31" formed by a portion of an outer surface 30' of the second outer panel flange 14b2 and by a portion of an outer surface 30" of the second inner panel flange. The first end section 9' and the second end section 9" comprise cooperating channels 50', 50" forming a through opening 51 for receiving a bolt 7 (not shown). When the dispenser payload joint 10 is assembled the first and second contact surfaces 31', 31" are abutting each other, forming the reference plane RP.

In FIG. 13 is further indicated, by dotted lines, the extension of the interacting surfaces, i.e. the first inner clamp (flange) locking surface 20a1, the second inner clamp (flange) locking surface 20a2, the first outer clamp (flange) locking surface 20b1, the second outer clamp (flange) locking surface 20b2, the first inner panel (flange) locking surface 21a1, the second inner panel (flange) locking surface 21a2, the first outer panel flange (locking) surface 21b1 and the second outer panel flange (locking) surface 21b2.

FIG. 13 shows the payload joint and panel from the outside of the dispenser, but could just the same be showing a view from the inside.

Two narrowly arranged dotted lines indicate a difference in width, i.e. in the lateral direction Y, of the inner or outer mid portion 13a, 13b with relation to the corresponding and combined width of the panel flange 14b1, 14b2 portions between the contact surfaces 31 'and 31" and respective panel flange locking surface 21a1, 21a2, 21b1, 21b2. The difference may depend on that the contact surfaces 31', 31" have not yet found their end positions, i.e. that clamp portions shall be brought further towards each other by the bolt such that further pressure will be applied on the panel flanges in the lateral direction Y, i.e. in the direction diminishing the gap between the contact surfaces 31', 31". The difference may also be the consequence of a chosen design with a more narrow inner or outer mid portion 13a, 13b with relation to the corresponding and combined width of the panel flange 14b1, 14b2.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

Figure 14:
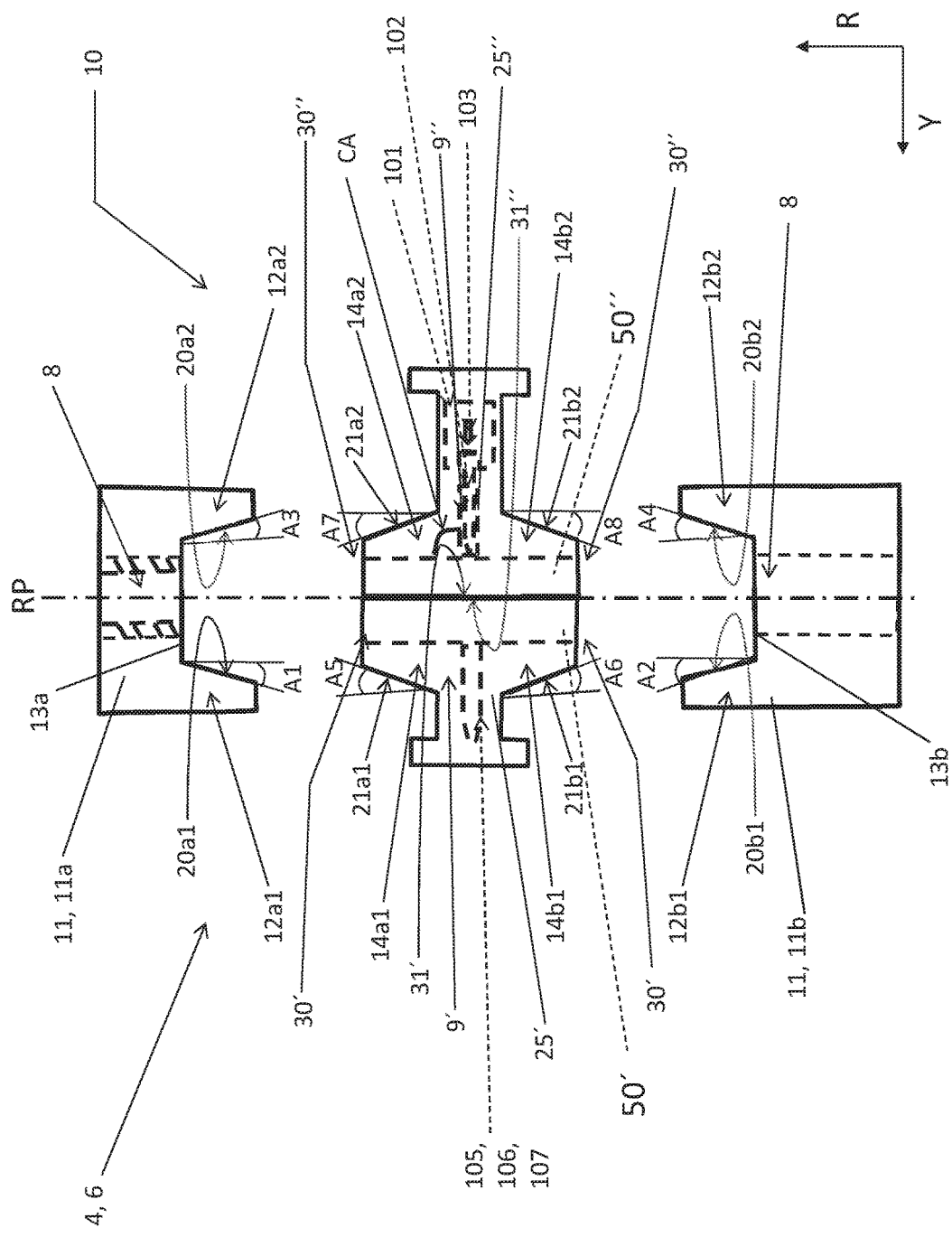
FIG. 14 schematically shows a payload joint according to one example of the invention, FIG. 15 schematically shows a top view of a payload joint according to one example of the invention, FIG. 16 schematically shows a cross-section of a payload joint according to FIG. 13 with two panels, FIG. 17 schematically shows an exploded view of FIG. 13, FIG. 18a schematically shows a side view of a payload joint according to FIG. 13 before attachment of a payload to a panel, FIG. 18b schematically shows a side view of a payload joint according to FIG. 13 after attachment of a payload to a panel, FIG. 18c schematically shows a front view of a payload joint according to FIG. 18b, FIG. 19 schematically shows perspective view of the payload joint according to the invention, FIG. 20 schematically shows a cross-section of FIG. 19 along line A-A according to one example, FIG. 21 schematically shows an exploded view FIG. 20, FIG. 22 schematically shows a cross-section of FIG. 19 along line A-A according to one example, and FIG. 23 schematically shows a cross-section of FIG. 19 along line A-A according to one example.

FIG. 14 schematically shows a payload joint 10 according to one example of the invention and has been discussed above. The payload joint 10 comprises a bolt cutter 101 that can be arranged in various ways depending on e.g. what type of construction element to used. For example, the first and second construction elements 2', 2" can be first and second panels according to FIGS. 1-13. One example of orientation and application of the bolt cutter 101 when used in a payload joint 10 for panels 2 is described in connection to FIGS. 15-17. According to another example, the first and second construction elements 2', 2" can be in the form of first and second attachment means for connecting a payload directly to a launch vehicle or indirectly via a dispenser or any other suitable device.

Figure 15:
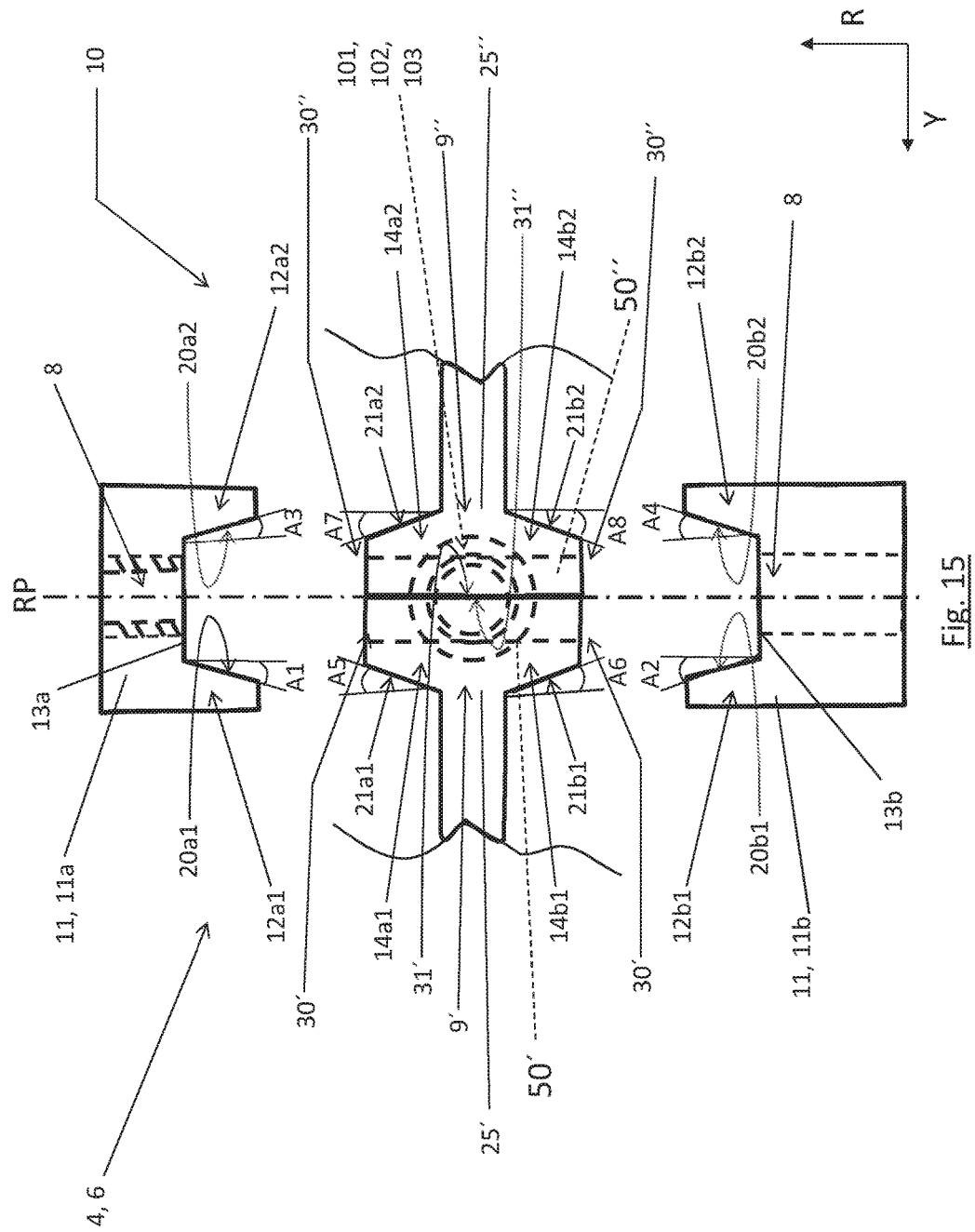

FIG. 15 schematically shows a top view of a payload joint according to one example of the invention where the bolt cutter 101 is arranged in the flanges 14a1, 14a2, 14b1, 14b2, 20; 21a1, 21a2, 21b1, 21b2 of the panels 2. FIG. 15 shows that the bolt cutter 101 and the cutting device 102 is arranged essentially perpendicular to the extension of the bolt 7 and the extension of the cutting device 102 coincides with the longitudinal extension X (see FIG. 13) of the panels 2. The first inner clamp flange 12a1 is arranged against the first inner construction element flange 14a1 and the first angle A1 is equal to or smaller or greater than the fifth angle A5, wherein the first outer clamp flange 12b1 is arranged against the first outer construction element flange 14b1 and the second angle A2 is equal to or smaller or greater than the sixth angle A6,
wherein the second inner clamp flange 12a2 is arranged against the second inner construction element flange 14a2 and the third angle A3 is equal to or smaller or greater than the seventh angle A7,
wherein the second outer clamp flange 12b2 is arranged against the second outer construction element flange 14b2 and the fourth angle A4 is equal to or smaller or greater than the eight angle A8.

The first end section 9' and the second end section 9" of the construction elements 2',2" comprise cooperating channels 50', 50" forming a through opening 51 for receiving the bolt 7 of the payload joint 10.

Figure 16:
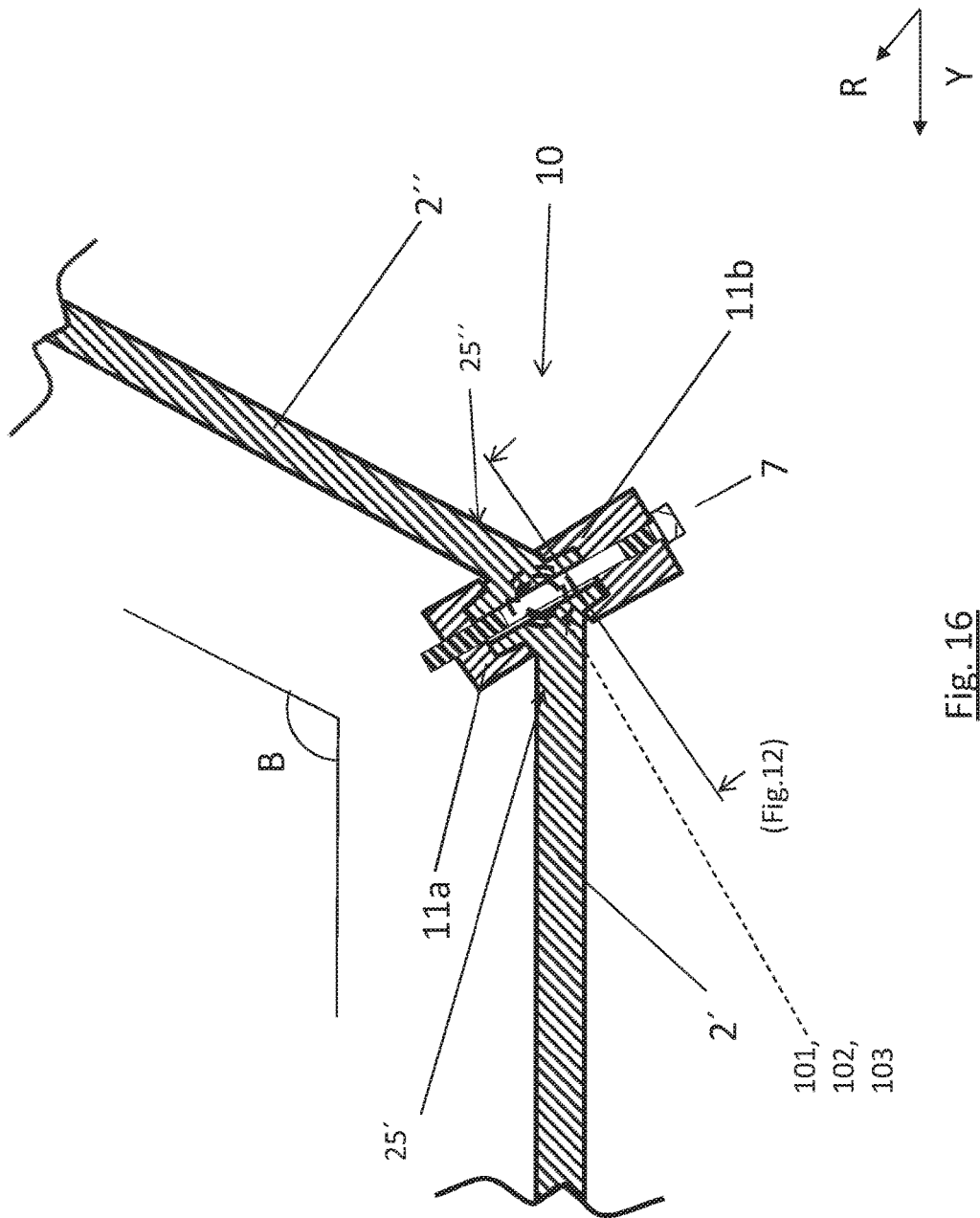

FIG. 16 schematically shows a cross section of a payload joint 10 according to FIGS. 13 and 15 with two panels 2 connected by the bolt 7. In FIG. 16, the construction elements 2 are first and second panels 2',2" being neighboring panels 2 of the payload dispenser 1.

Figure 17:
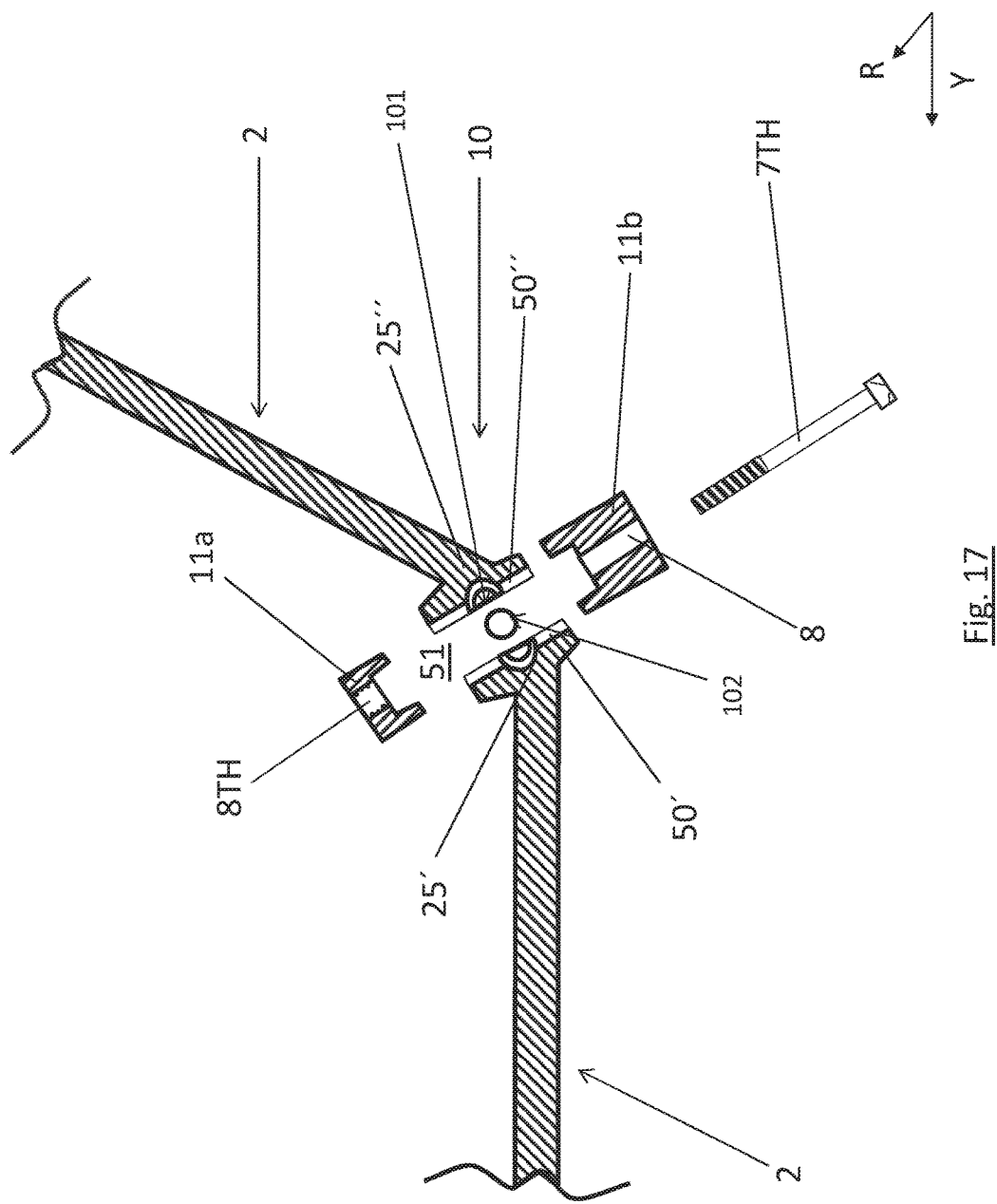

FIG. 17 schematically shows an exploded view of FIG. 15.

FIG. 18a schematically shows a side view of a payload joint 10 according to FIG. 13 before attachment of a payload 3 to a panel 2. It should be noted that the payload 3 can be attached to any type of arrangement in a spacecraft or launch vehicle.

FIG. 18b schematically shows a side view of a payload joint according to FIGS. 13 and 18a after attachment of a payload 3 to a panel 2.

FIG. 18c schematically shows a front view of a payload joint according to FIG. 18b. Hence, according to FIGS. 18a-c the construction elements 2 are fastening means for securing the payload 3 to the payload dispenser 1. Furthermore, the dispenser 1 comprise a panel comprising at least one payload 3 mounted onto the panel 2 with a payload joint according to any one of FIGS. 19-23. According to one example, the payload 3 is a satellite but can be any suitable spacecraft.

FIG. 19 schematically shows perspective view of the payload joint according to the invention. FIG. 19, in connection to FIGS. 20-23, shows that the bolt cutter 101 is arranged to function in a pre-loaded mode and a release mode, wherein in the pre-loaded mode the cutting device 102 is positioned adjacent to or at a distance to the bolt 7 and the driving device 103 is inactive, wherein in the release mode the driving device 103 is active such that the driving device 103 affects the cutting device 102 into a motion towards the bolt 7 with said shear force.

FIGS. 20-23 show that the bolt cutter 101 comprises a driving device housing 104 and a receiving housing 105, wherein the driving device 103 is arranged in the driving device housing 104 and wherein the receiving housing 105 is arranged to receive the cutting device 102.

Figure 20:
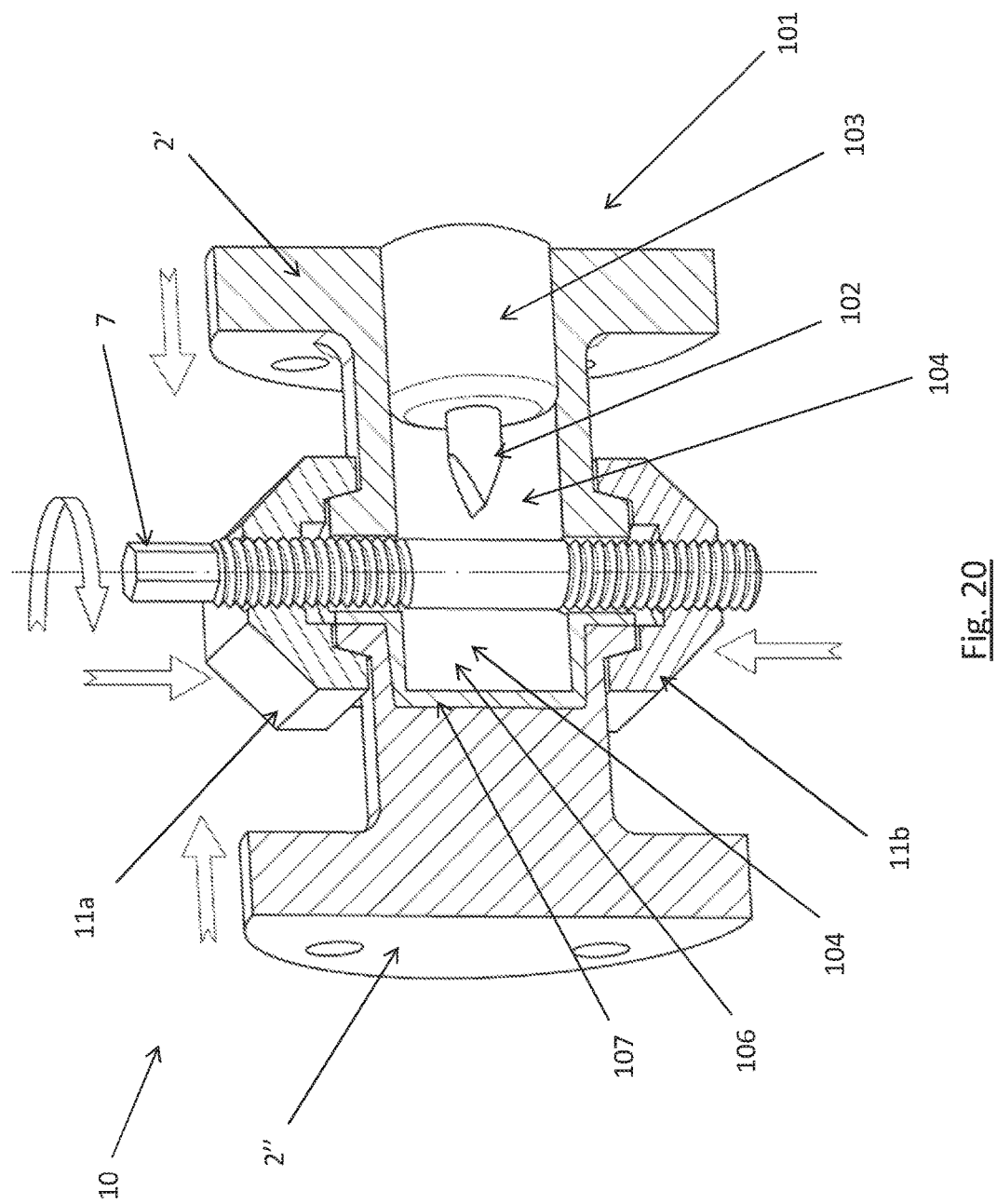

FIG. 20 schematically shows a cross-section of FIG. 19 along line A-A according to one example where the receiving housing 105 comprises a cavity 106 and where the cavity 106 has a funnel shape.

In FIG. 20 the construction elements 2 comprise the bolt cutter 101 and the first construction element 2' comprises the driving device housing 104 and the receiving housing 105. The second construction element 2" comprises a a receiving portion 107 for housing the receiving housing 107.

Figure 21:
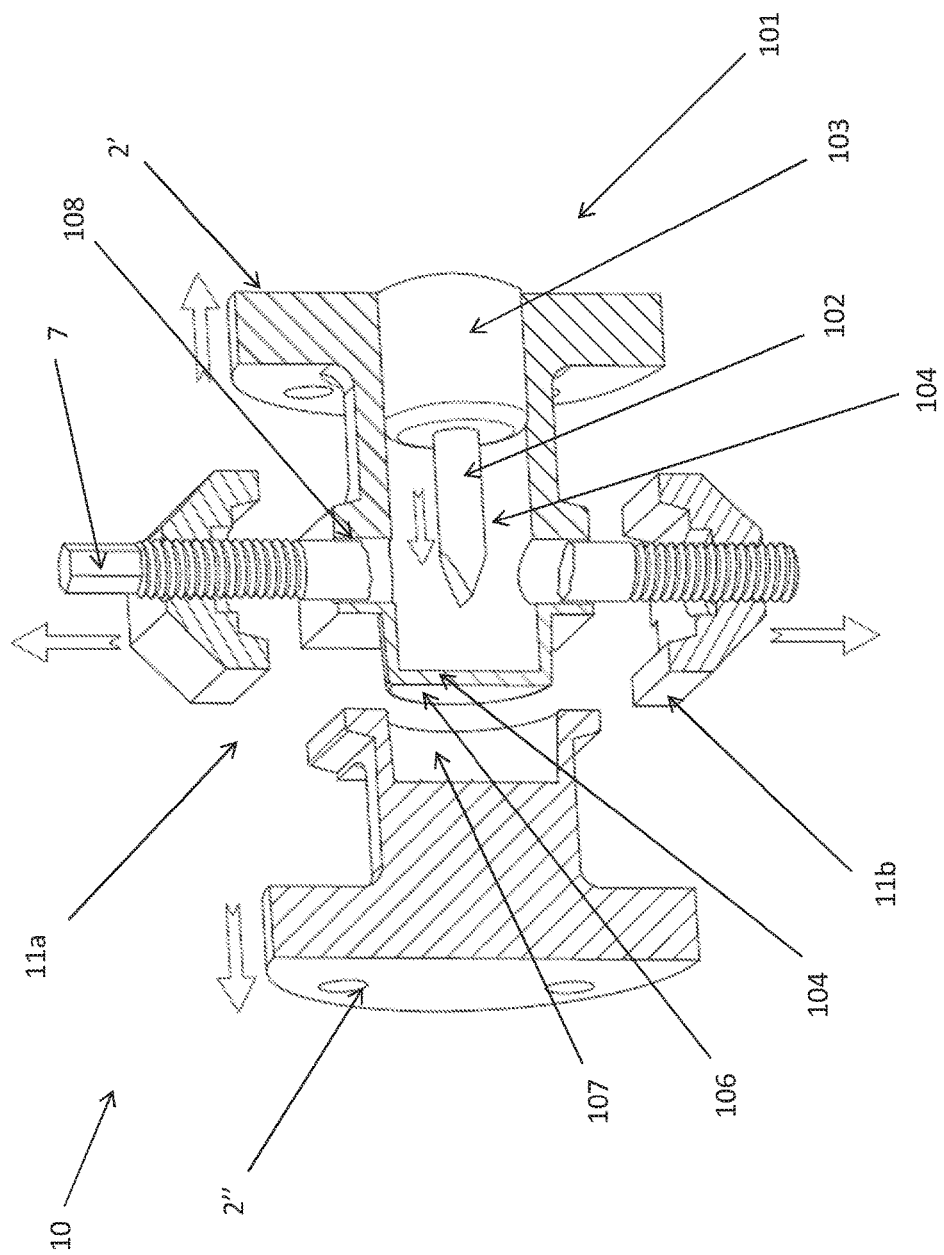

FIG. 21 shows that the first construction element comprises the driving device housing 104 and the receiving housing 105. This has the advantage that one construction element 2' comprises the entire bolt cutter 101 which means that after separation of the payload joint 10, the bolt cutter 101 accompanies the construction element 2' with all its parts. Yet an advantage is that any debris after the separation will be collected by the driving device housing 104 and the receiving housing 105. According to one example shown in FIG. 21, the driving device housing 104 and the receiving housing 105 is arranged as one unit with a through opening for the bolt 7. This arrangement can be realized by that only the first construction element 2' comprises the through opening 108 for the bolt or that both the first and second construction elements comprise cavities in the flanges (not shown) that together builds a through channel when the flanges are put together forming the payload joint.

According to one example when the first construction element 2' comprises the driving device housing 104 and the receiving housing 105, the second construction element 2" comprises a receiving portion 107 for housing the receiving housing 105. This has the advantage that the cutting device 102 can extend past the bolt 7 for ensuring the separation as stated above.

Figure 22:
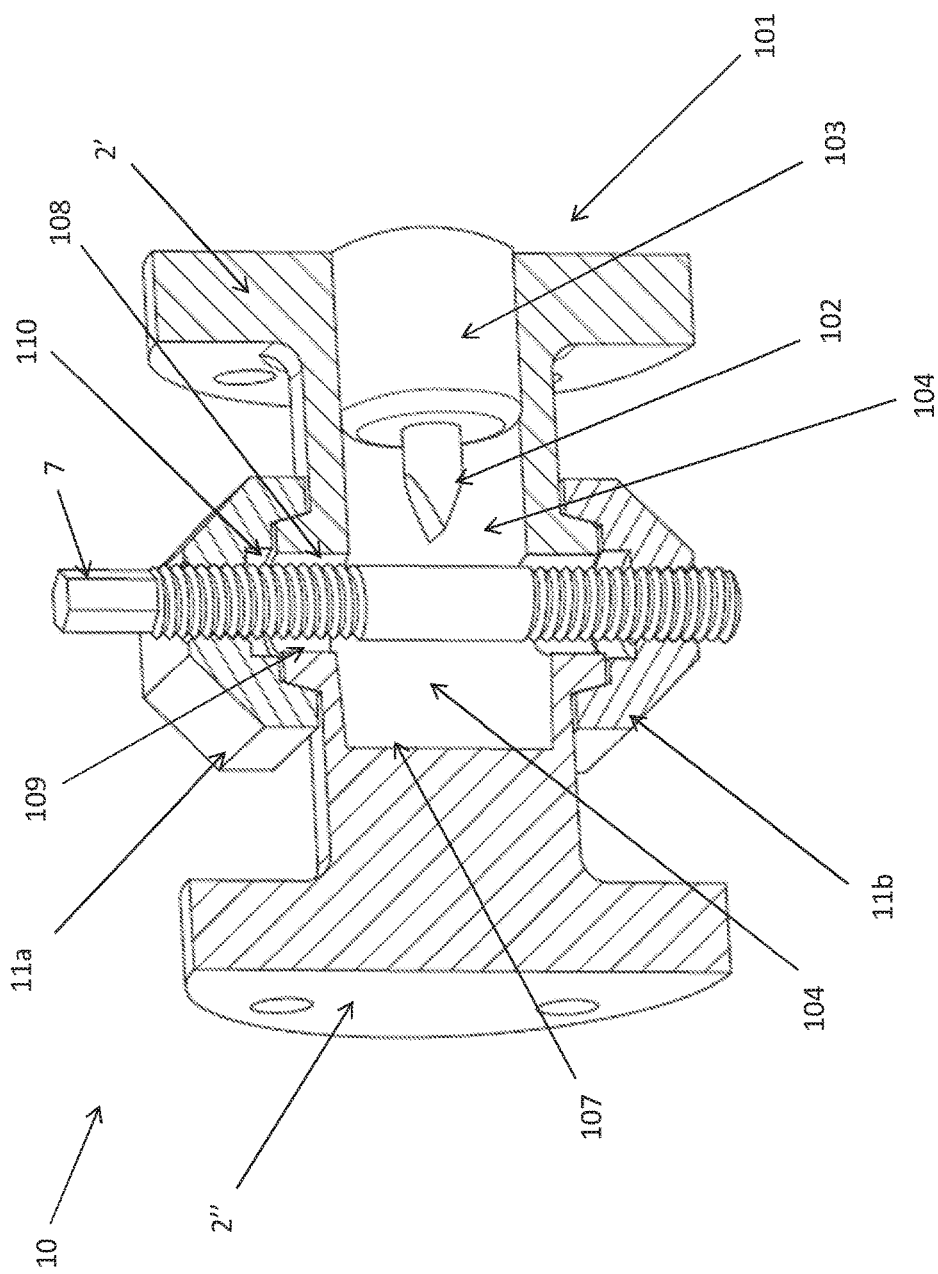

FIG. 22 schematically shows a cross-section of FIG. 19 along line A-A. FIG. 22 shows that the construction elements 2 comprise the bolt cutter 101 and where the first construction element 2' comprises the driving device housing 104 and where the second construction element 2" comprises the receiving housing 105 in the form of the cavity. Furthermore, the first end section 109 and the second end section 110 of the construction elements comprise cooperating channels forming a through opening 108 for receiving the bolt of the payload joint.

It should be noted that the receiving portion 107 in the second construction element 2" may be in the form of a should the driving device housing 104 be separate from the receiving housing 105.

Figure 23:
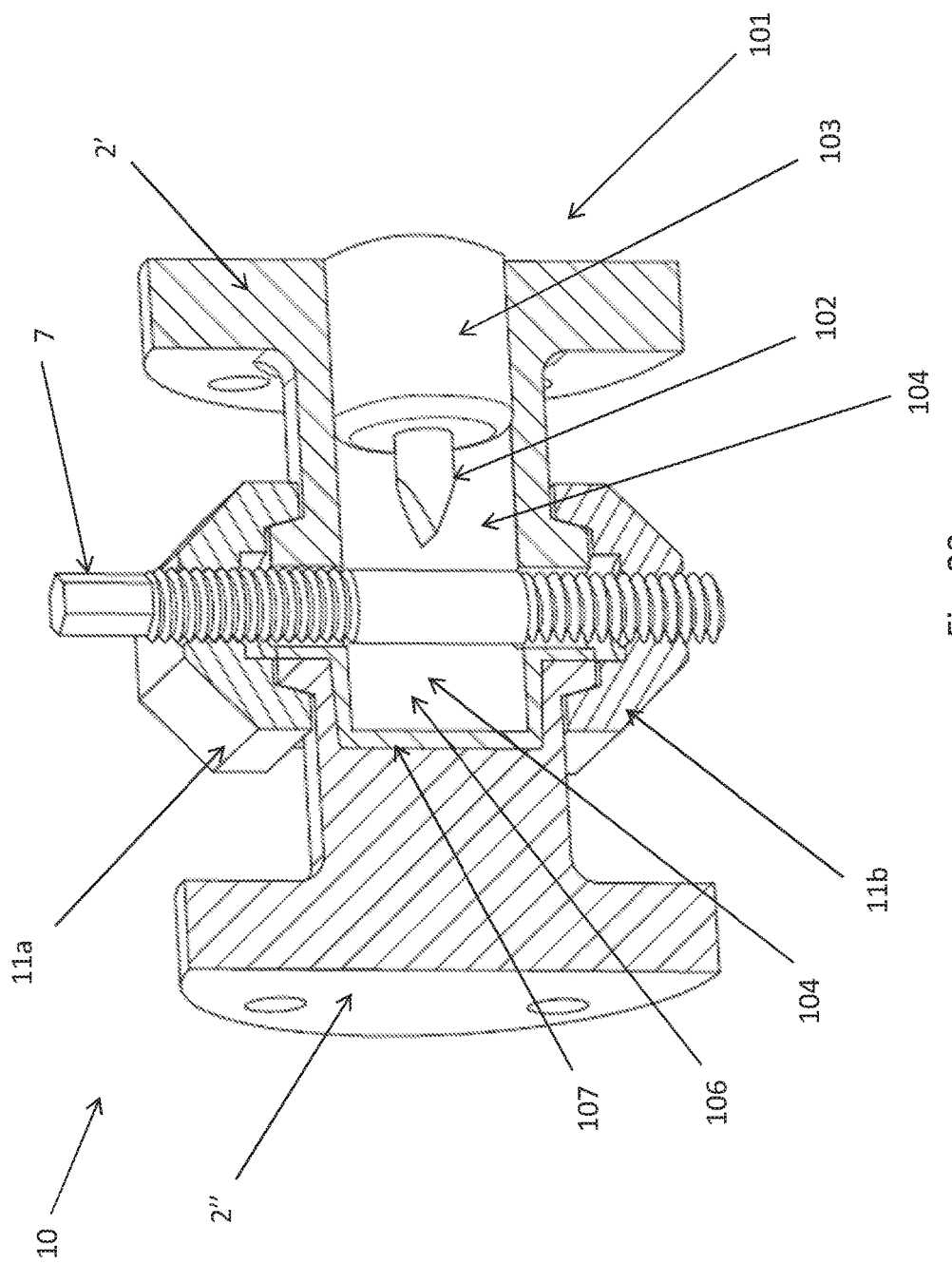

FIG. 23 schematically shows a cross-section of FIG. 19 along line A-A according to one example depicted the in FIGS. 20-21. As can be seen in FIGS. 19-23, the bolt 7 comprises threads for screwing the bolt 7 such that the clamps 11a, 11b move towards each other, and consequently tightens the payload joint 10 by forcing the flanges towards each other by the angled portions of the clamps and the flanges. According to one example shown in FIGS. 19-23, both clamps 11a, 11b comprise threads that engages two corresponding thread sets arranged in the bolt 7. According to one example shown in FIGS. 19-22, the threads in the bolt are arranged by one thread set being oriented for clockwise rotation and the other for anti-clockwise rotation. According to one example shown in FIG. 23, the threads in the bolt are arranged such that both thread sets are oriented for clockwise or anti-clockwise rotation, but with different angle of inclination on the thread. Hence, according to one example, the inner clamp portion and/or the outer clamp portion comprises a threaded through opening for allowing an at least partly threaded bolt to be threaded in the threaded opening. According to one example (not shown), the bolt is attached to a nut outside the clamp arrangement.

Furthermore, the invention further relates to a payload dispenser 1 for a launch vehicle, wherein the dispenser 1 comprises a plurality of panels 2, wherein at least one panel 2 comprises at least one payload 3 mounted onto the panel 2, wherein the panels 2 are attachable to each other by means of at least one dispenser payload joint 10 forming a self-supporting dispenser 1 according to what has been disclosed in connection to the drawings.

REFERENCE SIGNS 1. payload dispenser
2, 2', 2". panel
3. payload
4. longitudinal attachment means
5', 5" first and second panel portion
6. lateral attachment means
7. bolt
7TH. threaded bolt
8. through opening
8TH. threaded through opening
9', 9". first and second end section
10. payload joint
11. clamp
11a. inner clamp portion
11b. outer clamp portion
12a1. first inner clamp flange
12a2. second inner clamp flange
12b1. first outer clamp flange
12b2. second outer clamp flange
13a. inner mid portion
13b. outer mid portion
14a1. first inner panel flange
14a2. second inner panel flange
14b1. first outer panel flange
14b2. second outer panel flange
20a1. first inner clamp (flange) locking surface
20a2. second inner clamp (flange) locking surface
20b1. first outer clamp (flange) locking surface
20b2. second outer clamp (flange) locking surface
21a1. first inner panel (flange) locking surface
21a2. second inner panel (flange) locking surface
21b1. first outer panel flange (locking) surface
21b2. second outer panel flange (locking) surface
25', 25" first and second panel end portion
30', 30". outer surface
31', 31". first and second contact surface
50', 50". channels
51. through opening
X. panel extension in longitudinal direction
R. panel extension in radial direction, i.e. thickness direction
Y. panel extension in lateral direction
RP. reference plane
A1-A8. first-eight angle
101 Bolt cutter
102 cutting device
103 Driving device
104 driving device housing
105 and a receiving housing
106 cavity
107 receiving portion
108 through opening for the bolt
109 the first end section of the construction element
110 the second end section of the construction element

The invention claimed is:

1. A payload joint for detachably attaching to each other two adjacent construction elements in a spacecraft and/or launch vehicle, wherein the payload joint comprises:

a clamp, comprising an inner clamp portion and an outer clamp portion facing the inner clamp portion, each clamp portion comprising a through opening, wherein the payload joint comprises a bolt, configured to be arranged in the through openings, wherein the inner clamp portion comprises a first and second inner clamp flange and an inner mid portion between the first and second inner flanges, wherein the outer clamp portion comprises a first and second outer clamp flange and an outer mid portion between the first and second outer flanges, wherein the payload joint comprises a first construction element end portion of a first construction element comprising a first end section and a second construction element end portion of a second construction element comprising a second end section, and wherein the first end section comprises a first outer construction element flange and a first inner construction element flange, wherein the second end section comprises a second outer construction element flange and a second inner construction element flange, wherein the first end section comprises a first contact surface formed by a portion of an outer surface of the first outer construction element flange and by a portion of an outer surface of the first inner construction element flange, and wherein the second end section comprises a second contact surface formed by a portion of an outer surface of the second outer construction element flange and by a portion of an outer surface of the second inner construction element flange, wherein the first and second contact surfaces are abutting each other in the payload joint forming a reference plane, wherein a first inner clamp locking surface of the first inner clamp flange is arranged at a first angle to the reference plane, wherein a first outer clamp locking surface of the first outer clamp flange is arranged at a second angle to the reference plane, wherein a second inner clamp locking surface of the second inner clamp flange is arranged at a third angle to the reference plane, wherein a second outer clamp locking surface of the second outer clamp flange is arranged at a fourth angle to the reference plane, wherein a first inner construction element locking surface of the first inner construction element flange is arranged at a fifth angle to the reference plane, wherein a first outer construction element locking surface of the first outer construction element flange is arranged at a sixth angle to the reference plane, wherein a second inner construction element locking surface of the second inner construction element flange is arranged at a seventh angle to the reference plane, wherein a second outer construction element locking surface of the second outer construction element flange is arranged at an eighth angle to the reference plane, wherein the payload joint comprises a bolt cutter comprising a cutting device arranged at a cutting angle towards the bolt and a driving device arranged in connection to the cutting device and arranged to drive the cutting device towards the bolt with a shear force that breaks and separates the bolt into two or more pieces, wherein the cutting angle is defined with reference to a normal to a length extension of the bolt and being zero degrees or close to zero degrees.

2. The payload joint according to claim 1, wherein the bolt cutter is arranged to function in a pre-loaded mode and a release mode, wherein in the pre-loaded mode the cutting device is positioned adjacent to or at a distance to the bolt and the driving device is inactive, wherein in the release mode the driving device is active such that the driving device affects the cutting device into a motion towards the bolt with said shear force.

3. The payload joint according to claim 1, wherein the bolt cutter comprises a driving device housing and a receiving housing, wherein the driving device is arranged in the driving device housing and wherein the receiving housing is arranged to receive the cutting device.

4. The payload joint according to claim 3, wherein the receiving housing comprises a cavity.

5. The payload joint according to claim 4, wherein the cavity has a funnel shape.

6. The payload joint according to claim 3, wherein the construction elements comprise the bolt cutter, wherein the first construction element comprises the driving device housing and wherein the second construction element comprises the receiving housing.

7. The payload joint according to claim 3, wherein the construction elements comprise the bolt cutter wherein the first construction element comprises the driving device housing and the receiving housing.

8. The payload joint according to claim 3, wherein the second construction element comprises a receiving portion for housing the receiving housing.

9. The payload joint according to claim 1, wherein the first inner clamp flange is arranged against the first inner construction element flange and the first angle is equal to or smaller or greater than the fifth angle, wherein the first outer clamp flange is arranged against the first outer construction element flange and the second angle is equal to or smaller or greater than the sixth angle, wherein the second inner clamp flange is arranged against the second inner construction element flange and the third angle is equal to or smaller or greater than the seventh angle, wherein the second outer clamp flange is arranged against the second outer construction element flange and the fourth angle is equal to or smaller or greater than the eighth angle.

10. The payload joint according to claim 1, wherein the inner clamp portion and/or the outer clamp portion comprises a threaded through opening for allowing an at least partly threaded bolt to be threaded in the threaded opening.

11. The payload joint according to claim 1, wherein the first end section and the second end section of the construction elements comprise cooperating channels forming a through opening for receiving the bolt of the payload joint.

12. The payload joint according to claim 1, wherein the construction elements are fastening means for securing the payload to a spacecraft and/or launch vehicle.

13. The payload joint according to claim 1, wherein the construction elements are first and second panels being neighboring panels of the payload dispenser.

14. A payload dispenser for a launch vehicle, wherein the payload dispenser comprises:

a panel comprising at least one payload mounted onto the panel with a payload joint, wherein the payload joint comprises:

a clamp, comprising an inner clamp portion and an outer clamp portion facing the inner clamp portion, each clamp portion comprising a through opening, wherein the payload joint comprises a bolt, configured to be arranged in the through openings, wherein the inner clamp portion comprises a first and second inner clamp flange and an inner mid portion between the first and second inner flanges, wherein the outer clamp portion comprises a first and second outer clamp flange and an outer mid portion between the first and second outer flanges, wherein the payload joint comprises a first construction element end portion of a first construction element comprising a first end section and a second construction element end portion of a second construction element comprising a second end section, and wherein the first end section comprises a first outer construction element flange and a first inner construction element flange, wherein the second end section comprises a second outer construction element flange and a second inner construction element flange, wherein the first end section comprises a first contact surface formed by a portion of an outer surface of the first outer construction element flange and b a portion of an outer surface of the first inner construction element flange, and wherein the second end section comprises a second contact, surface formed by a portion of an outer surface of the second outer construction element flange and by a portion of an outer surface of the second inner construction element flange, wherein the first and second contact surfaces are abutting each other in the payload joint forming a reference plane, wherein a first inner clamp locking surface of the first inner clamp flange is arranged at a first angle to the reference plane, wherein a first outer clamp locking surface of the first outer clamp flange is arranged at a second angle to the reference plane, wherein a second inner clamp locking surface of the second inner clamp flange is arranged at a third angle to the reference plane, wherein a second outer clamp locking surface of the second outer clamp flange is arranged at a fourth angle to the reference plane, wherein a first inner construction element locking surface of the first inner construction element flange is arranged at a fifth angle to the reference plane, wherein a first outer construction element locking surface of the first outer construction element flange is arranged at a sixth angle to the reference plane, wherein a second inner construction element locking surface of the second inner construction element flange is arranged at a seventh angle to the reference plane, wherein a second outer construction element locking surface of the second outer construction element flange is arranged at an eighth angle to the reference plane, wherein the payload joint comprises a bolt cutter comprising a cutting device arranged at a cutting angle towards the bolt and a driving device arranged in connection to the cutting device and arranged to drive the cutting device towards the bolt with a shear force that breaks and separates the bolt into two or more pieces, wherein the cutting angle is defined with reference to a normal to a length extension of the bolt and being zero degrees or close to zero degrees.

15. The payload dispenser according to claim 14, wherein the payload is a satellite.

16. A payload dispenser for a launch vehicle, wherein the payload dispenser comprises:

a plurality of panels, wherein at least one panel comprises at least one payload mounted onto the panel, wherein the panels are attachable to each other by means of at least one payload joint forming a self-supporting dispenser, wherein the at least one payload joint comprises:

a clamp, comprising an inner clamp portion and an outer clamp portion facing the inner clamp portion, each clamp portion comprising a through opening, wherein the payload joint comprises a bolt, configured to be arranged in the through openings, wherein the inner clamp portion comprises a first and second inner clamp flange and an inner mid portion between the first and second inner flanges, wherein the outer clamp portion comprises a first and second outer clamp flange and an outer mid portion between the first and second outer flanges, wherein the payload joint comprises a first construction element end portion of a first construction element comprising a first end section and a second construction element end portion of a second construction element comprising a second end section, wherein the first construction element and the section construction element are first and second panels being neighboring panels of the payload dispenser, and wherein the first end section comprises a first outer construction element flange, and a first inner construction element flange, wherein the second end section comprises a second outer construction element flange and a second inner construction element flange, wherein the first end section comprises a first contact surface formed by a portion of an outer surface of the first outer construction element flange and by a portion of an outer surface of the first inner construction element flange, and herein the second end section comprises a second contact surface formed by a portion of an outer surface of the second outer construction element flange and by a portion of an outer surface of the second inner construction element flange, wherein the first, and second contact surfaces are abutting each other in the payload joint forming a reference plane, wherein a first inner clamp locking surface of the first inner clamp flange is arranged at a first angle to the reference plane, wherein a first outer clamp locking surface of the first outer clamp flange is arranged at a second angle to the reference plane, wherein a second inner clamp locking surface of the second inner clamp flange is arranged at a third angle to the reference plane, wherein a second outer clamp locking surface of the second outer clamp flange is arranged at a fourth angle to the reference plane, wherein a first inner construction element locking surface of the first inner construction element flange is arranged at a fifth angle to the reference plane, wherein a first outer construction element locking surface of the first outer construction element flange is arranged at a sixth angle to the reference plane, wherein a second inner construction element locking surface of the second inner construction element flange is arranged at a seventh angle to the reference plane, wherein a second outer construction element locking surface of the second outer construction element flange is arranged at an eighth angle to the reference plane, wherein the payload joint comprises a bolt cutter comprising a cutting device arranged at a cutting angle towards the bolt and a driving device arranged in connection to the cutting device and arranged to drive the cutting device towards the bolt with a shear force that breaks and separates the bolt into two or more pieces, wherein the cutting angle is defined with reference to a normal to a length extension of the bolt and being zero degrees or close to zero degrees.

\* \* \* \* \*